US012626234B2

(12) United States Patent
Kim et al.

(10) Patent No.: US 12,626,234 B2
(45) Date of Patent: May 12, 2026

(54) SELF-EXECUTING PROGRAM FOR OUTBOUND MESSAGES

(71) Applicant: Coinbase, Inc., Oakland, CA (US)

(72) Inventors: Peter Jihoon Kim, Austin, TX (US);
Brock Miller, New York, NY (US);
Kai Luo, Los Angeles, CA (US);
Jiangchuan He, Redmond, WA (US);
Vignesh Muralidharan, Seattle, WA
(US); Rajeev Vishaka, Austin, TX (US)

( * ) Notice: Subject to any disclaimer, the term of this
patent is extended or adjusted under 35
U.S.C. 154(b) by 217 days.

(21) Appl. No.: 18/102,590

(22) Filed: Jan. 27, 2023

(65) Prior Publication Data

US 2024/0257084 A1 Aug. 1, 2024

(51) Int. Cl.
G06Q 20/10 (2012.01)
G06Q 20/06 (2012.01)
G06Q 20/36 (2012.01)
G06Q 20/38 (2012.01)

(52) U.S. Cl.
CPC ......... G06Q 20/108 (2013.01); G06Q 20/065
(2013.01); G06Q 20/3678 (2013.01); **G06Q
20/389** (2013.01)

(58) Field of Classification Search
CPC ... G06Q 20/108; G06Q 20/065; G06Q 20/389
See application file for complete search history.

(56) References Cited

U.S. PATENT DOCUMENTS

| | | | | |
|---|---|---|---|---|
| 11,200,569 | B1 * | 12/2021 | James | G06Q 20/381 |
| 11,282,139 | B1 * | 3/2022 | Winklevoss | G06Q 40/04 |
| 11,790,360 | B1 * | 10/2023 | Abou Daya | G06Q 20/3678 |
| | | | | 705/65 |
| 2017/0068943 | A1 * | 3/2017 | Narayana | G06Q 20/20 |
| 2019/0287175 | A1 * | 9/2019 | Hill | G06Q 40/04 |
| 2019/0318424 | A1 * | 10/2019 | McWilliams | G06Q 20/10 |
| 2020/0058023 | A1 * | 2/2020 | Travizano | H04L 9/3239 |
| 2020/0125391 | A1 * | 4/2020 | Lee | G06Q 20/389 |
| 2020/0272619 | A1 * | 8/2020 | Alferov | H04L 9/3239 |

(Continued)

OTHER PUBLICATIONS

"IEEE Standard for a Custodian Framework of Cryptocurrency," in
IEEE Std 2140.5.2020 , vol. no., pp. 1-23, Jul. 17, 2020.*

*Primary Examiner* — Steven S Kim
(74) *Attorney, Agent, or Firm* — Holland & Hart LLP

(57) ABSTRACT

A custodial token platform may implement a single smart
contract for outbound messages. The custodial token plat-
form may deploy, to a blockchain distributed data store, a
self-executing program that batches messages from the
self-executing program to multiple addresses of the block-
chain distributed data store that are external to a custodial
token platform associated with the self-executing program.
The custodial token platform may select, from the multiple
withdrawal requests and based on selection criteria, a set of
withdrawal requests to fulfill via a batch message from the
self-executing program. The custodial token platform may
broadcast, to the blockchain distributed data store, a mes-
sage that calls the self-executing program. The message
includes an indication of a set of external addresses associ-
ated with the set of withdrawal requests, and the message
causes a transfer of a set of crypto tokens from the self-
executing program to the external addresses via the batch
message.

18 Claims, 15 Drawing Sheets

(56)          References Cited

U.S. PATENT DOCUMENTS

| | | | | |
|---|---|---|---|---|
| 2020/0304559 | A1* | 9/2020 | Ibryam | ................. H04L 9/0643 |
| 2020/0379981 | A1* | 12/2020 | Yoon | ................... G06F 16/2379 |
| 2021/0365943 | A1* | 11/2021 | Buldas | .............. G06Q 20/3829 |
| 2023/0088674 | A1* | 3/2023 | Lee | ...................... G06Q 20/389 |
| | | | | 705/75 |
| 2023/0119843 | A1* | 4/2023 | Witham | ................. G06Q 40/04 |
| | | | | 705/75 |
| 2023/0360033 | A1* | 11/2023 | Dragan | ................. G06Q 40/02 |
| 2024/0177147 | A1* | 5/2024 | Wen | ................... G06Q 20/4014 |
| 2024/0177150 | A1* | 5/2024 | Guo | ...................... H04L 9/3218 |

* cited by examiner

305

310

315

320

325

Data Store

Transaction Batcher

Self-Executing Program

Receiver

300

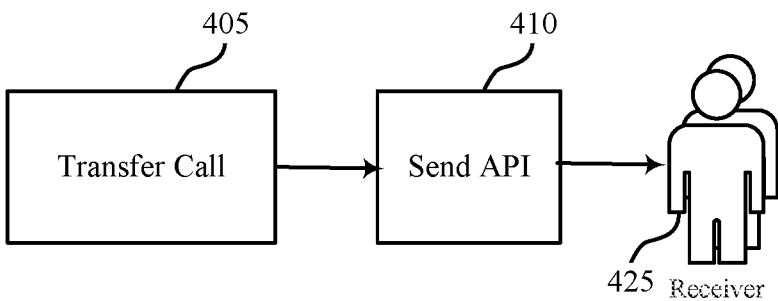
405
410
Transfer Call → Send API →
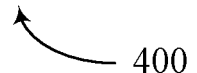
425  Receiver
400
FIG. 4

Owner

Controller

Pauser

Batch SC

Figure 11:
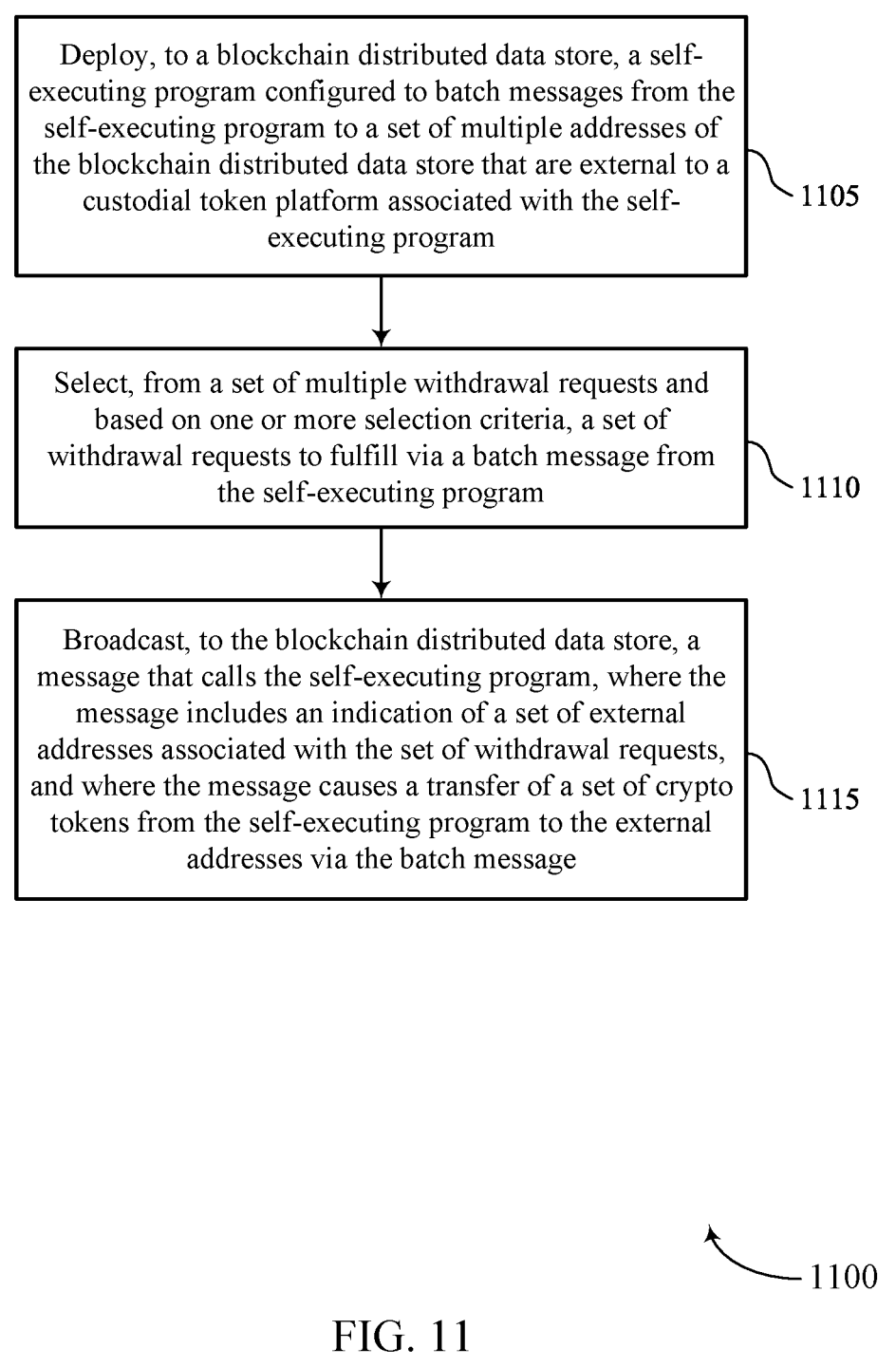

Deploy, to a blockchain distributed data store, a self-executing program configured to batch messages from the self-executing program to a set of multiple addresses of the blockchain distributed data store that are external to a custodial token platform associated with the self-executing program

1105

Select, from a set of multiple withdrawal requests and based on one or more selection criteria, a set of withdrawal requests to fulfill via a batch message from the self-executing program

1110

Broadcast, to the blockchain distributed data store, a message that calls the self-executing program, where the message includes an indication of a set of external addresses associated with the set of withdrawal requests, and where the message causes a transfer of a set of crypto tokens from the self-executing program to the external addresses via the batch message

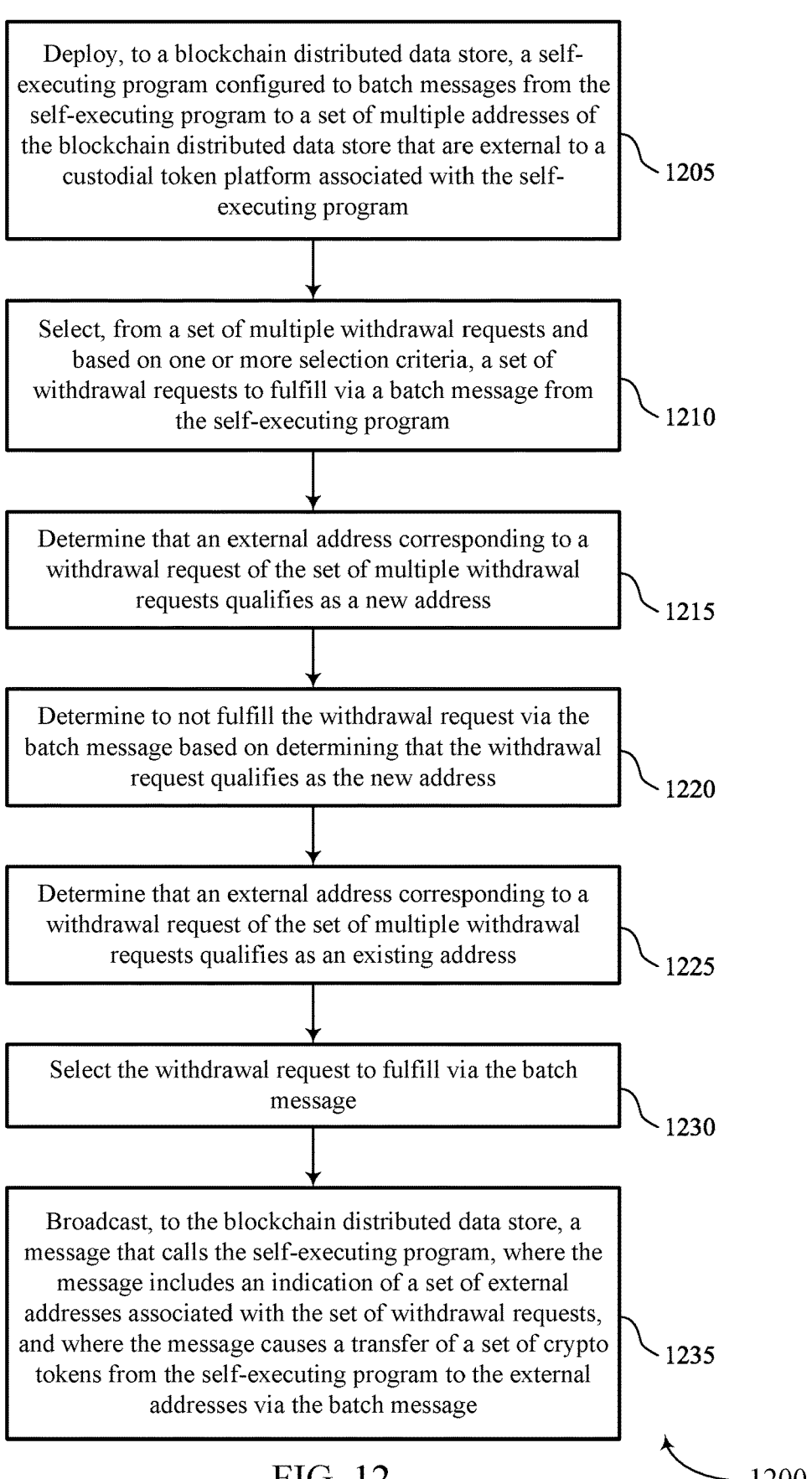

Deploy, to a blockchain distributed data store, a self-executing program configured to batch messages from the self-executing program to a set of multiple addresses of the blockchain distributed data store that are external to a custodial token platform associated with the self-executing program

1205

Select, from a set of multiple withdrawal requests and based on one or more selection criteria, a set of withdrawal requests to fulfill via a batch message from the self-executing program

1210

Determine that an external address corresponding to a withdrawal request of the set of multiple withdrawal requests qualifies as a new address

1215

Determine to not fulfill the withdrawal request via the batch message based on determining that the withdrawal request qualifies as the new address

1220

Determine that an external address corresponding to a withdrawal request of the set of multiple withdrawal requests qualifies as an existing address

1225

Select the withdrawal request to fulfill via the batch message

1230

Broadcast, to the blockchain distributed data store, a message that calls the self-executing program, where the message includes an indication of a set of external addresses associated with the set of withdrawal requests, and where the message causes a transfer of a set of crypto tokens from the self-executing program to the external addresses via the batch message

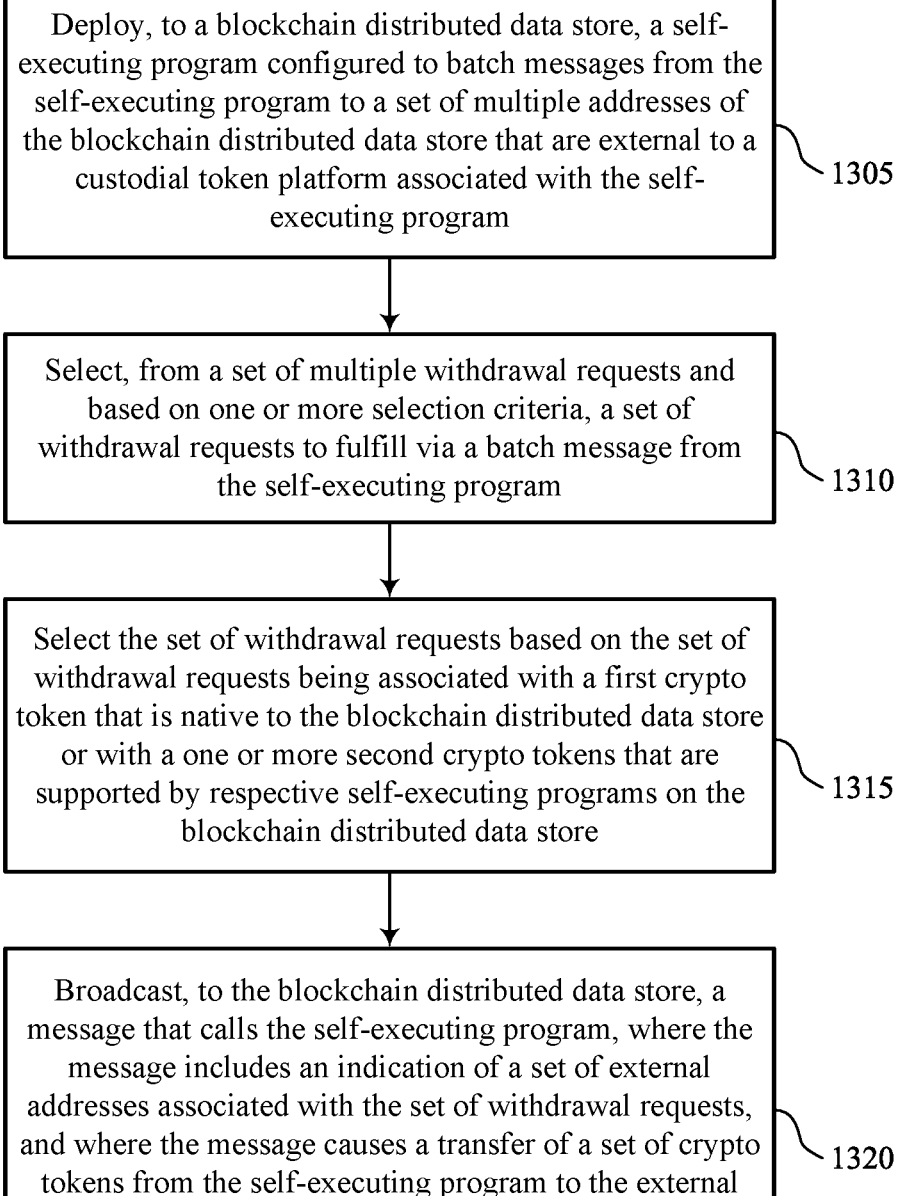

Deploy, to a blockchain distributed data store, a self-executing program configured to batch messages from the self-executing program to a set of multiple addresses of the blockchain distributed data store that are external to a custodial token platform associated with the self-executing program

1305

Select, from a set of multiple withdrawal requests and based on one or more selection criteria, a set of withdrawal requests to fulfill via a batch message from the self-executing program

1310

Select the set of withdrawal requests based on the set of withdrawal requests being associated with a first crypto token that is native to the blockchain distributed data store or with a one or more second crypto tokens that are supported by respective self-executing programs on the blockchain distributed data store

1315

Broadcast, to the blockchain distributed data store, a message that calls the self-executing program, where the message includes an indication of a set of external addresses associated with the set of withdrawal requests, and where the message causes a transfer of a set of crypto tokens from the self-executing program to the external addresses via the batch message

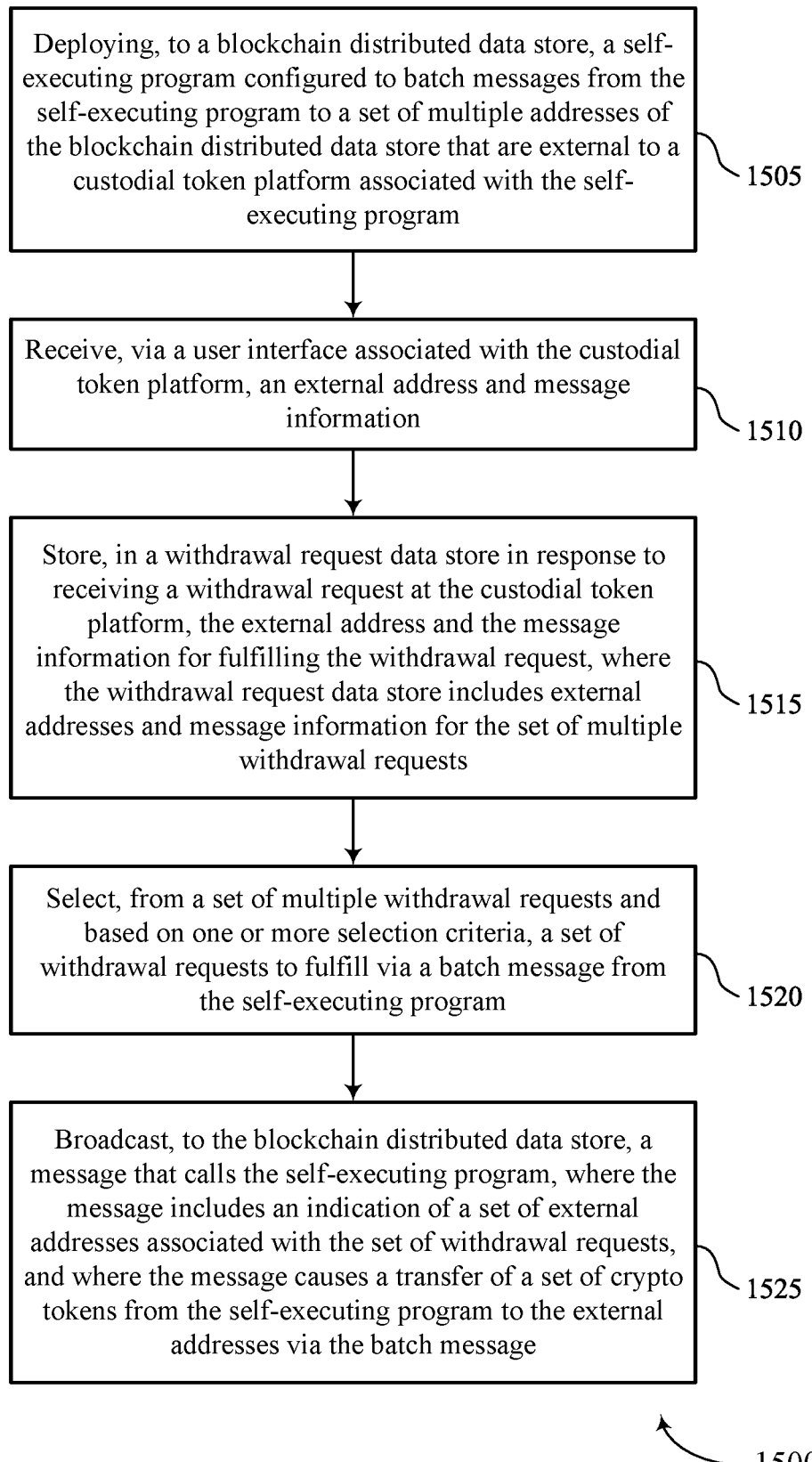

Deploying, to a blockchain distributed data store, a self-executing program configured to batch messages from the self-executing program to a set of multiple addresses of the blockchain distributed data store that are external to a custodial token platform associated with the self-executing program
1505

Receive, via a user interface associated with the custodial token platform, an external address and message information
1510

Store, in a withdrawal request data store in response to receiving a withdrawal request at the custodial token platform, the external address and the message information for fulfilling the withdrawal request, where the withdrawal request data store includes external addresses and message information for the set of multiple withdrawal requests
1515

Select, from a set of multiple withdrawal requests and based on one or more selection criteria, a set of withdrawal requests to fulfill via a batch message from the self-executing program
1520

Broadcast, to the blockchain distributed data store, a message that calls the self-executing program, where the message includes an indication of a set of external addresses associated with the set of withdrawal requests, and where the message causes a transfer of a set of crypto tokens from the self-executing program to the external addresses via the batch message
1525

SELF-EXECUTING PROGRAM FOR OUTBOUND MESSAGES

FIELD OF TECHNOLOGY

The present disclosure relates generally to token management, including techniques for self-executing program for outbound messages.

BACKGROUND

Blockchains and related technologies may be employed to support recordation of ownership of digital assets, such as cryptocurrencies, fungible tokens, non-fungible tokens (NFTs), and the like. Generally, peer-to-peer networks support transaction validation and recordation of transfer of such digital assets on blockchains. Various types of consensus mechanisms may be implemented by the peer-to-peer networks to confirm transactions and to add blocks of transactions to the blockchain networks. Example consensus mechanisms include the proof-of-work consensus mechanism implemented by the Bitcoin network and the proof-of-stake mechanism implemented by the Ethereum network. Some nodes of a blockchain network may be associated with a digital asset exchange, which may be accessed by users to trade digital assets or trade a fiat currency for a digital asset.

BRIEF DESCRIPTION OF THE DRAWINGS

FIG. 4 illustrates an example of transfer logic that supports self-executing program for outbound messages in accordance with aspects of the present disclosure.

FIGS. 11 through 15 illustrate flowcharts showing methods that support self-executing program for outbound messages in accordance with aspects of the present disclosure.

DETAILED DESCRIPTION

Figure 1:
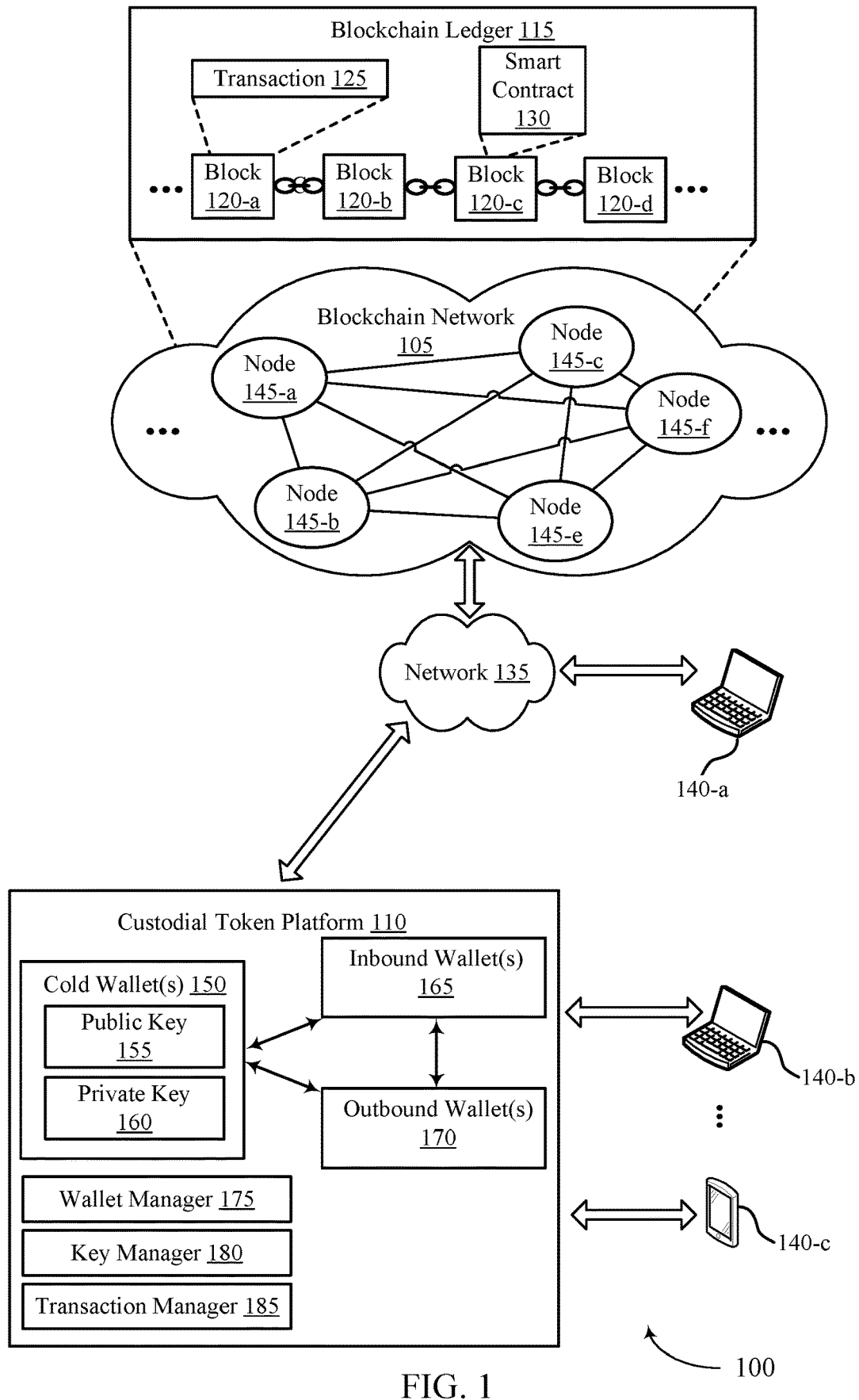
FIG. 1 illustrates an example of a computing environment that supports self-executing program for outbound messages in accordance with aspects of the present disclosure.

A user may access a custodial token platform to purchase, sell, exchange, or trade digital assets, such as cryptocurrencies, crypto tokens, or the like. A custodial token platform may support various types of wallets for deposits, withdrawals, and storage. For example, the custodial token platform may generate inbound wallets associated with inbound addresses for user deposits of crypto tokens to accounts associated with the user. The custodial token platform may also use outbound wallets for supporting withdrawals of crypto tokens and cold storage wallets for security. In some cases, the custodial token platform may support a wallet orchestration procedure that moves the crypto tokens between the various wallets of the custodial token platform for various reasons including liquidity management and security. In some examples, the wallet orchestration may be performed manually by administrators of the custodial token platform or may be performed via a static configuration. However, as cryptocurrency markets are increasingly dynamic, wallet orchestration between various wallets of a custodial token platform is increasingly complex, and may require consideration of current market states, market histories, and current wallet balances.

In some examples, a wallet orchestration procedure may periodically flush crypto tokens from inbound addresses to other addresses associated with the custodial token platform via flush transactions. For example, the flush transactions may transfer or flush crypto tokens from an inbound address to an outbound address of an outbound wallet to support user withdrawals via withdrawal transactions. The custodial token platform may transmit messages to cause withdrawals for each user and/or each withdrawal request. For example, withdrawal requests by three different recipients (e.g., three different outbound addresses) may result in three withdrawal transactions. A withdrawal transaction is associated with transaction fees and thus, multiple withdrawal transactions may result in significant transaction fees (e.g., gas fees) for a blockchain network associated with the crypto tokens. As hundreds or thousands of these transactions may be performed by the custodial token platform, for example, for withdrawals to move cryptocurrency between each user account and recipient, the transactions and corresponding fees may result in significant processing fee overhead for the custodial token platform.

Techniques described herein address the forgoing by supporting deployment, to a blockchain network, of a batched smart contract (e.g., a self-executing program) that manages multiple withdrawals via a single transaction. Thus, instead of broadcasting a transaction for each withdrawal request, the multiple withdrawals may be batched into a single withdrawal transaction using the smart contract. The dedicated batched smart contract may hold funds to support user withdrawals. The custodial token platform may broadcast a single transaction to support the multiple transfers of the crypto tokens to the external addresses. The transfer of the crypto tokens from the batched smart contract to the external addresses may occur via a single transaction on the blockchain ledger. As such, this technique may result in fewer transactions, and as a result, less resource overhead and transaction fee overhead for the custodial token platform.

In some examples, the custodial token platform may maintain a data store that includes information associated with withdrawal requests, and the custodial token platform may periodically select withdrawal requests from the data store to fulfill via the batched smart contract. The selection may be based on the type of crypto token that is to be withdrawn, based on the requested withdrawal amount, based on satisfying a threshold number of withdrawal requests, based on whether an external address is considered a new address, based on a first-in-first-out (FIFO) scheme, based on satisfaction of a total withdrawal amount, or some combination thereof. These and other techniques are described in further detail with respect to the figures.

FIG. 1 illustrates an example of a computing environment 100 that supports self-executing program for outbound messages in accordance with aspects of the present disclosure. The computing environment 100 may include a blockchain network 105 that supports a blockchain ledger 115, a custodial token platform 110, and one or more computing devices 140, which may be in communication with one another via a network 135.

The network 135 may allow the one or more computing devices 140, one or more nodes 145 of the blockchain network 105, and the custodial token platform 110 to communicate (e.g., exchange information) with one another. The network 135 may include aspects of one or more wired networks (e.g., the Internet), one or more wireless networks (e.g., cellular networks), or any combination thereof. The network 135 may include aspects of one or more public networks or private networks, as well as secured or unsecured networks, or any combination thereof. The network 135 also may include any quantity of communications links and any quantity of hubs, bridges, routers, switches, ports or other physical or logical network components.

Nodes 145 of the blockchain network 105 may generate, store, process, verify, or otherwise use data of the blockchain ledger 115. The nodes 145 of the blockchain network 105 may represent or be examples of computing systems or devices that implement or execute a blockchain application or program for peer-to-peer transaction and program execution. For example, the nodes 145 of the blockchain network 105 support recording of ownership of digital assets, such as cryptocurrencies, fungible tokens, non-fungible tokens (NFTs), and the like, and changes in ownership of the digital assets. The digital assets may be referred to as tokens, coins, crypto tokens, or the like. The nodes 145 may implement one or more types of consensus mechanisms to confirm transactions and to add blocks (e.g., blocks 120-*a*, 120-*b*, 120-*c*, and so forth) of transactions (or other data) to the blockchain ledger 115. Example consensus mechanisms include a proof-of-work consensus mechanism implemented by the Bitcoin network and a proof-of-stake consensus mechanism implemented by the Ethereum network.

When a device (e.g., the computing device 140-*a*, 140-*b*, or 140-*c*) associated with the blockchain network 105 executes or completes a transaction associated with a token supported by the blockchain ledger, the nodes 145 of the blockchain network 105 may execute a transfer instruction that broadcasts the transaction (e.g., data associated with the transaction) to the other nodes 145 of the blockchain network 105, which may execute the blockchain application to verify the transaction and add the transaction to a new block (e.g., the block 120-*d*) of a blockchain ledger (e.g., the blockchain ledger 115) of transactions after verification of the transaction. Using the implemented consensus mechanism, each node 145-*c* may function to support maintaining an accurate blockchain ledger 115 and prevent fraudulent transactions.

The blockchain ledger 115 may include a record of each transaction (e.g., a transaction 125) between wallets (e.g., wallet addresses) associated with the blockchain network 105. Some blockchains may support smart contracts, such as smart contract 130, which may be an example of a subprogram that may be deployed to the blockchain and executed when one or more conditions defined in the smart contract 130 are satisfied. For example, the nodes 145 of the blockchain network 105 may execute one or more instructions of the smart contract 130 after a method or instruction defined in the smart contract 130 is called by another device. In some examples, the blockchain ledger 115 is referred to as a blockchain distributed data store.

A computing device 140 may be used to input information to or receive information from the computing system custodial token platform 110, the blockchain network 105, or both. For example, a user of the computing device 140-*a* may provide user inputs via the computing device 145-*a*, which may result in commands, data, or any combination thereof being communicated via the network 135 to the computing system custodial token platform 110, the blockchain network 105, or both. Additionally, or alternatively, a computing device 140-*a* may output (e.g., display) data or other information received from the custodial token platform 110, the blockchain network 105, or both. A user of a computing device 140-*a* may, for example, use the computing device 140-*a* to interact with one or more user interfaces (e.g., graphical user interfaces (GUIs)) to operate or otherwise interact with the custodial token platform 110, the blockchain network 105, or both.

A computing device 140 and/or a node 145 may be a stationary device (e.g., a desktop computer or access point) or a mobile device (e.g., a laptop computer, tablet computer, or cellular phone). In some examples, a computing device 140 and/or a node 145 may be a commercial computing device, such as a server or collection of servers. And in some examples, a computing device 140 and/or a node 145 may be a virtual device (e.g., a virtual machine).

Some blockchain protocols support layer one and layer two crypto tokens. A layer one token is a token that is supported by its own blockchain protocol, meaning that the layer one token (or a derivative thereof), may be used to pay transaction fees for transacting using the blockchain protocol. A layer two token is a token that is built on top of layer one, for example, using a smart contract 130 or a decentralized application ("Dapp"). The smart contract 130 or decentralized application may issue layer two tokens to various users based on various conditions, and the users may transact using the layer two tokens, but transaction fees may be based on the layer one token (or a derivative thereof).

The custodial token platform 110 may support exchange or trading of digital assets, fiat currencies, or both by users of the custodial token platform 110. The custodial token platform 110 may be accessed via website, web application, or applications that are installed on the one or more computing devices 140. The custodial token platform 110 may be configured to interact with one or more types of blockchain networks, such as the blockchain network 105, to support digital asset purchase, exchange, deposit, and withdrawal.

For example, users may create accounts associated with the custodial token platform 110 such as to support purchasing of a digital asset via a fiat currency, selling of a digital asset via fiat currency, or exchanging or trading of digital assets. A key management service (e.g., a key manager) of the custodial token platform 110 may create, manage, or otherwise use private keys that are associated with user wallets and internal wallets. For example, if a user wishes to withdraw a token associated with the user account to an external wallet address, key manager 180 may sign a transaction associated with a wallet of the user, and broadcast the signed transaction to nodes 145 of the blockchain network 105, as described herein. In some examples, a user does not have direct access to a private key associated with a wallet or account supported or managed by the custodial token platform 110. As such, user wallets of the custodial token platform 110 may be referred to non-custodial wallets or non-custodial addresses.

The custodial token platform 110 may create, manage, delete, or otherwise use various types of wallets to support digital asset exchange. For example, the custodial token platform 110 may maintain one or more internal cold wallets 150. The internal cold wallets 150 may be an example of an offline wallet, meaning that the cold wallet 150 is not directly coupled with other computing systems or the network 135 (e.g., at all times). The cold wallet 150 may be used by the custodial token platform 110 to ensure that the custodial token platform 110 is secure from losing assets via hacks or other types of unauthorized access and to ensure that the custodial token platform 110 has enough assets to cover any potential liabilities. The one or more cold wallets 150, as well as other wallets of the blockchain network 105 may be implemented using public key cryptography, such that the cold wallet 150 is associated with a public key 155 and a private key 160. The public key 155 may be used to publicly transact via the cold wallet 150, meaning that another wallet may enter the public key 155 into a transaction such as to move assets from the wallet to the cold wallet 150. The private key 160 may be used to verify (e.g., digitally sign) transactions that are transmitted from the cold wallet 150, and the digital signature may be used by nodes 145 to verify or authenticate the transaction. Other wallets of the custodial token platform 110 and/or the blockchain network 105 may similarly use aspects of public key cryptography.

The custodial token platform 110 may also create, manage, delete, or otherwise use inbound wallets 165 and outbound wallets 170. For example, a wallet manager 175 of the custodial token platform 110 may create a new inbound wallet 165 for each user or account of the custodial token platform 110 or for each inbound transaction (e.g., deposit transaction) for the custodial token platform 110. In some examples, the custodial token platform 110 may implement techniques to move digital asset between wallets of the digital asset exchange platform. Assets may be moved based on a schedule, based on asset thresholds, liquidity requirements, or a combination thereof. In some examples, movements or exchanges of assets internally to the custodial token platform 110 may be "off-chain" meaning that the transactions associated with the movement of the digital asset are not broadcast via the corresponding blockchain network (e.g., blockchain network 105). In such cases, the custodial token platform 110 may maintain an internal accounting (e.g., ledger) of assets that are associated with the various wallets and/or user accounts.

As used herein, a wallet, such as inbound wallets 165 and outbound wallets 170 may be associated with a wallet address, which may be an example of a public key, as described herein. The wallets may be associated with a private key that is used to sign transactions and messages associated with the wallet. A wallet may also be associated with various user interface components and functionality. For example, some wallets may be associated with or leverage functionality for transmitting crypto tokens by allowing a user to enter a transaction amount, a receiver address, etc. into a user interface and clicking or activating a UI component such that the transaction is broadcast via the corresponding blockchain network via a node (e.g., a node 145) associated with the wallet. As used herein, "wallet" and "address" may be used interchangeably.

In some cases, the custodial token platform 110 may implement a transaction manager 185 that supports monitoring of one or more blockchains, such as the blockchain ledger 115, for incoming transactions associated with addresses managed by the custodial token platform 110 and creating and broadcasting on-blockchain transactions when a user or customer sends a digital asset (e.g., a withdrawal). For example, the transaction manager 185 may monitor the addressees of the customers for transfer of layer one or layer two tokens supported by the blockchain ledger 115 to the addresses managed by the custodial token platform 110. As another example, when a user is withdrawing a digital asset, such as a layer one or layer two token, to an external wallet (e.g., an address that is not managed by the custodial token platform 110 or an address for which the custodial token platform 110 does not have access to the associated private key), the transaction manager 185 may create and broadcast the transaction to one or more other nodes 145 of the blockchain network 105 in accordance with the blockchain application associated with the blockchain network 105. As such, the transaction manager 185, or an associated component of the custodial token platform 110 may function as a node 145 of the blockchain network 105.

As described herein, the custodial token platform may implement and support various wallets including the inbound wallets 165, the outbound wallets 170, and the cold wallets 150. Further, the custodial token platform 110 may implement techniques to maintain and manage balances of the various wallets. In some examples, the balances of the various wallets are configured to support security and liquidity. For example, the custodial token platform 110 may implement transactions that move crypto tokens between the inbound wallets 165 and the outbound wallets 170. These transactions may be referred to as "flush" transactions and may occur on a periodic or scheduled basis.

As described herein, various transactions may be broadcast to the blockchain ledger 115 to cause transfer of crypto tokens, to call smart contracts, to deploy smart contracts etc. In some examples, these transactions may also be referred to as messages. That is, the custodial token platform 110 may broadcast a message to the blockchain network 105 to cause transfer of tokens between wallets managed by the custodial token platform 110 to case transfer of tokens from a wallet managed by the custodial token platform 110 to an external wallet, to deploy a smart contract (e.g., a self-executing program), or to call a smart contract.

Additionally, a user may access a custodial token platform 110 to purchase, sell, exchange, or trade digital assets, such as cryptocurrencies, crypto tokens, or the like. A custodial token platform 110 may support various types of wallets for deposits, withdrawals, and storage. For example, the custodial token platform may generate inbound wallets 165 associated with inbound addresses for user deposits of crypto tokens to accounts associated with the user. The custodial token platform may also use outbound wallets 170 for supporting withdrawals of crypto tokens and cold storage wallets for security. In some cases, the custodial token platform may support a wallet orchestration procedure that moves the crypto tokens between the various wallets of the custodial token platform 110 for various reasons including liquidity management and security. In some examples, the wallet orchestration may be performed manually by administrators of the custodial token platform 110 or may be performed via a static configuration. However, as cryptocurrency markets are increasingly dynamic, wallet orchestration between various wallets of a custodial token platform is increasingly complex, and may cause consideration of current market states, market histories, and current wallet balances.

In some examples, a wallet orchestration procedure may periodically flush crypto tokens from inbound addresses to other addresses associated with the custodial token platform via flush transactions. For example, the flush transactions may transfer or flush crypto tokens from an inbound address to an outbound address of an outbound wallet 170 to support user withdrawals. For example, a user may request withdrawal from the user account of the custodial token platform 110 to an external address (e.g., an address not managed by the custodial token platform 110), and in response, the custodial token platform may broadcast a transaction that is configured to transfer the crypto tokens from the outbound wallet 165 to the external address. Each withdrawal request may result in a separate withdrawal transaction that is broadcast to the blockchain network 105. A withdrawal transaction is associated with transaction fees and thus, multiple withdrawal transactions may result in significant transaction fees (e.g., gas fees) for the user and/or the custodial token platform 110. As hundreds or thousands of these transactions may be performed by the custodial token platform 110, for example, for withdrawals to move cryptocurrency between each user account and external address and recipient, the transactions and corresponding fees may result in significant processing fee overhead for the custodial token platform 110.

Techniques described herein address the forgoing by supporting deployment, to a blockchain network 105, of a batched smart contract that manages multiple withdrawals via a single transaction. Thus, instead of broadcasting (e.g., to the blockchain network 105) a withdrawal transaction from the outbound wallets 170 to the external address for each withdrawal request, the multiple withdrawal requests may be fulfilled via a single transaction broadcast by the custodial token platform 110. A dedicated batched smart contract may hold funds to support withdrawals to the external addresses. The custodial token platform 110 may broadcast the single transaction that is configured to transfer crypto tokens from the batched smart contract to the respective external addresses. The transfer of the crypto tokens from the batched smart contract to the external addresses may occur via a single transaction on the blockchain ledger 115. As such, this technique may result in fewer transactions, and as a result, less resource overhead and transaction fee overhead for the custodial token platform 110.

As described herein, the users may request withdrawals of crypto tokens from the custodial token platform 110. The withdrawal requests may also be referred to as send requests herein, as in some examples, the crypto tokens are not sent to an external address associated with the user making the request, but to another external address. As such, withdrawal and send may be used interchangeably herein. Additionally, the transactions that transfer the crypto tokens from the smart contract (or from the outbound wallets 170) to the external addresses may be referred to as outbound transactions or outbound messages.

Figure 2:
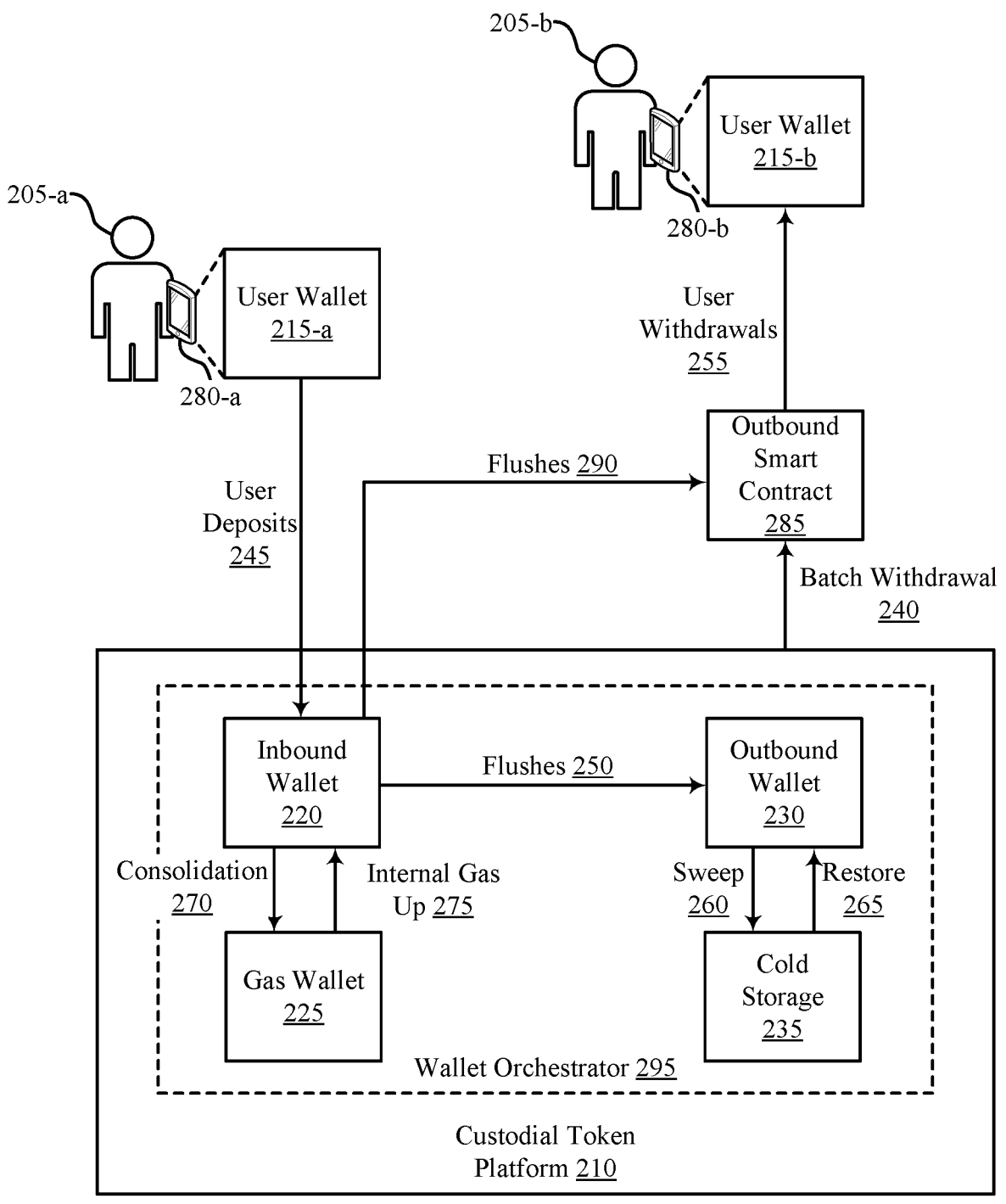
FIG. 2 illustrates another example of an example of a computing environment that supports self-executing program for outbound messages in accordance with aspects of the present disclosure.

FIG. 2 illustrates an example of a computing environment 200 that supports self-executing program for outbound messages in accordance with aspects of the present disclosure. The computing environment 200 includes a custodial token platform 210 and users 205 with respective user devices 280. The custodial token platform 210 may be an example of the custodial token platform 110 as described with respect to FIG. 1, and the user devices 280 may be examples of computing devices 140 as described with respect to FIG. 1. Although the discussions described herein relate to cryptocurrency with respect to crypto tokens, the cryptocurrency may include tokens, coins, digital currency, and the like.

The custodial token platform 210 may support various wallets for various purposes. For example, the custodial token platform 210 supports inbound wallets 220, gas wallets 225, outbound wallets 170, and cold storage 235 (e.g., cold storage wallets). In some examples, the custodial token platform 210 may create or implement a new inbound wallet 220 per user 205, per user account, or per deposit transaction 245. For example, the user 205-a may access a user wallet 215-a on the user device 280-a to generate and broadcast a deposit transaction 245 to deposit a crypto token to an account associated with the custodial token platform 210. The account may be associated with user 205-a or another user. In some examples, for each deposit transaction 245 (e.g., user deposits), the custodial token platform 210 generates a new inbound wallet 220. In other cases, the custodial token platform 210 may maintain an inbound wallet 220 per user account (or per crypto token per user account or per blockchain network used by a user account).

Additionally, as described herein, the custodial token platform 210 (e.g., a wallet orchestrator 295) may broadcast transactions (e.g., to the blockchain network 105 of FIG. 1) to transfer crypto tokens between the various wallets of the custodial token platform 110. For example, the custodial token platform 210 may implement periodic flush transactions 250 to move crypto tokens between inbound wallets 220 and the outbound wallets 230. In some examples, the flush transactions 250 are used to support user withdrawal transactions 255. For example, a user 205 may access a user account on the custodial token platform 210 (e.g., via the user device 280-b) and withdraw funds (via a withdrawal transaction 255) to the external user wallet 215-b or send funds to another external user wallet associated with another user. As such, the custodial token platform 210 may maintain an adequate balance of the outbound wallet 230 to support withdrawals. The custodial token platform 210 may also implement sweep transactions 260 to move crypto tokens from the outbound wallet 230 to the cold storage 235 and restore transactions 265 to move crypto tokens from the cold storage 235 to the outbound wallet 230.

In some cases, a job is executed periodically to perform the flush transactions 250. The job may select a set of inbound addresses with the highest balances (e.g., top ten inbound addresses with the highest balances). The job may flush the balances in an order determined by the balance and prioritize outbound wallets 230 to target the flushes (e.g., receive the crypto tokens). In some examples, the job may consider the balance and the gas fee to determine whether to flush an inbound wallet 220. For example, if the balance is greater than three times the gas fee (e.g., network fee), then the job may flush the balance. In some cases, the custodial token platform 210 may use the gas wallet 225 to consolidate crypto tokens (e.g., via a consolidation transaction 270) and to leverage for providing assets (e.g., crypto tokens) to cover transaction fees (e.g., via internal gas up transactions 275). For example, after determining to flush one of the inbound wallets 220, the custodial token platform may provide tokens to the inbound wallet 220 via the internal gas up transaction 275 and flush the inbound wallet 220 via the flush transaction 250. Any tokens remaining in the inbound wallet 220) after the flush may be provided to the gas wallet 225 via a consolidation transaction 270).

Further, users may request to withdraw crypto tokens from the custodial token platform 210 to external address (e.g., user wallet 215). In some examples, to support withdrawals, the custodial token platform 210 may broadcast a transaction for each withdrawal request, and each transaction may transfer the crypto tokens from the outbound wallet 230 to the external user wallet 215. Each withdrawal transaction may be associated with network fees on the blockchain network, and in some examples, the custodial token platform 210 may cover some or all the fees associated with a withdrawal transaction. As the custodial token platform 210 may support hundreds, thousands, or more, of such transactions a day, the withdrawals may be associated with significant transaction fee and resource overhead for the custodial token platform 210.

Techniques described herein support efficient wallet orchestration by aggregating multiple individual withdrawal transactions (e.g., user withdrawal transaction 255) into a single transaction (e.g., rather than individual withdrawal transactions for each withdrawal request). In particular, one or more outbound smart contracts 285 may be deployed to the blockchain network and used to manage and perform the withdrawals to outbound addresses (e.g., user wallet 215-*b*). Thus, instead of using an outbound wallet 230 for supporting withdrawals, the custodial token platform 210 may use the outbound smart contract 285 to support user withdrawals.

Thus, the outbound smart contract 285 deployed to the blockchain network to support multiple withdrawals via a single transaction broadcast by the custodial token platform 210. By way of example, multiple users (e.g., users 205) may request, via a user interface at the custodial token platform, withdrawals to respective external addresses. Information associated with the withdrawal requests may be stored by the custodial token platform 210 in a data store. The wallet orchestrator 295 may select a set of withdrawal requests to fulfill using the outbound smart contract 285. The custodial token platform 210 may generate and broadcast a message (e.g., batch withdrawal transaction 240)) that is configured to call the outbound smart contract 285 to cause transfer of a set of crypt tokens from the outbound smart contract 285 to external addresses, such as to user wallet 215 via user withdrawal transaction 255. The message that is broadcast by the custodial token platform 210 may include information for the batch withdrawal, such as external addresses, token amounts, etc. Such information may be retrieved from the data store that stores withdrawal request information. The transfer of the crypto tokens from the outbound smart contracts 285 to the external address may occur via a single transaction on the blockchain ledger. That is, the withdrawals may be identified via a single transaction, and the single transaction may include multiple state transfers (transfer of crypto tokens from the outbound smart contract 285 to the respective external addresses) that correspond to the set of withdrawals associated with the transaction. As such, this technique may result in fewer transactions, and as a result, reduced resource overhead and transaction fee overhead for the custodial token platform 210.

To support batched withdrawals, the outbound smart contract 285 may maintain various token balances. As such, the custodial token platform 210 (e.g., the wallet orchestrator 295) may periodically broadcast flush transactions 290 that transfer crypto tokens from the inbound wallets 220 (or inbound smart contracts, in some cases) to the outbound smart contract 285. The flushes may be implemented periodically or based on some condition being satisfied, such as a token balance at the outbound smart contract 285 falling below a threshold balance. As described in further detail herein, the custodial token platform 210 may select withdrawal or send request to batch based on various criteria.

Figure 3:
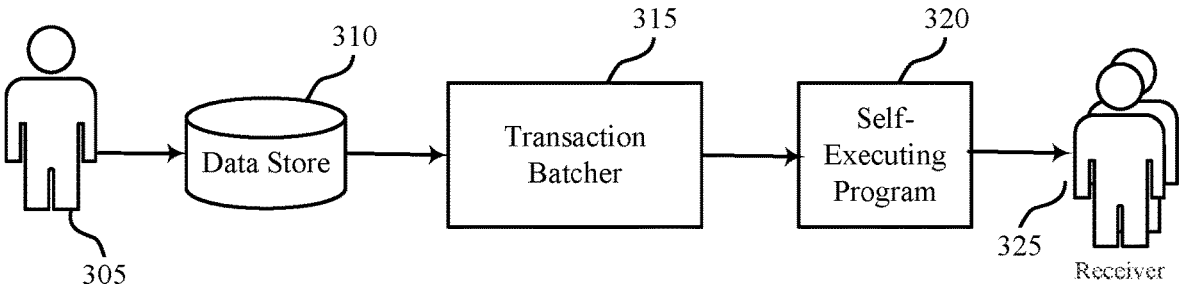
FIG. 3 illustrates an example of a diagram of a system that supports self-executing program for outbound messages in accordance with aspects of the present disclosure.

FIG. 3 illustrates an example of a diagram of a system 300 that supports self-executing program for outbound messages in accordance with aspects of the present disclosure. The system 300 includes a sender 305, a data store 310, a transaction batcher 315, a self-executing program 320), and one or more receivers 325. The sender 305 and the receivers 325 may be examples of the users 205 as described with respect to FIG. 2, and the self-executing program 320 may be an example of the outbound smart contract 285 as described with respect to FIG. 2.

The data store 310 may be a temporary storage that stores information associated with requested withdrawals or sends for transferring crypto tokens from user accounts to the receiver 325 (e.g., external addresses associated with the receiver) via the self-executing program 320. For example, if the sender 305 requests a send or withdrawal at the custodial token platform, information associated with the send may be stored to the data store 310, and the information may include the crypto token type, amount to send, external address that is the target to receive the send, etc. The data store 310 may store such information based on a data scheme involving data tables, where the data organized by rows and columns. Multiple withdrawal or send requests (associated with one or multiple senders 305) may be stored in the data store 310. The data store 310 may be referred to as a withdrawal request data store.

In some examples, a trigger event may cause the transaction batcher 315 to select multiple send/withdrawal requests to fulfill via the self-executing program 320 and a single transaction. In some examples, the triggering event may include a threshold time, such as after two minutes (e.g., send or withdrawal requests are batched every two minutes). In some events, the triggering event may include a quantity of withdrawal or send requests in the data store 310 or an amount associated with a set of withdrawals being above a threshold. For example, the threshold may include greater than ten withdrawal requests.

The transaction batcher 315 may select withdrawal or send requests to fulfill via a single transaction and the self-executing program 320 based on various criteria. In some examples, the transaction batcher 315 may select send/withdrawals requests from the data store 310 based on the type of crypto token that is to be sent or withdrawn. For example, the transaction batcher 315 may batch sends or withdrawals for native crypto tokens for a particular blockchain network. More particularly, if the self-executing program 320 supports both ETH token (the token native to the Ethereum blockchain) and ERC20 token withdrawals (e.g., tokens supported by another smart contract or Dapp), the transaction batcher 315 may select a set of send/withdrawal requests corresponding to the native tokens to be processed together via a single batch transaction. Similarly, the transaction batcher 315 may select send/withdrawal requests corresponding to ERC20 tokens to be processed via a separate single batch transaction. In some examples, different ERC20 tokens may be processed together in the same batch transaction. The transaction batcher 315 may separate batch transactions for native tokens (ETH) and other tokens (ERC20) because implementing these different token types in the same batch may result in a more complex function interface at the self-executing program 320 (e.g., more complex struct types). As a result of the more complex function interface, gas associated with contract deployment and use may be high relative to implementing these transactions using different functions. In some examples, different self-executing programs 320 may be deployed to support withdrawals or sends for native tokens and tokens supported by other smart contracts (other self-executing programs).

The transaction batcher 315 may also consider the balance or liquidity of a crypto token at the self-executing program 320 in selecting sends/withdrawals. For example, the transaction batcher 315 may select sends/withdrawals such that the balance (or a threshold relative to the balance) is not exceeded. Thus, the transaction batcher 315 may filter requests that may exceed the balance or threshold balance. Additionally, or alternatively, the transaction batcher 315 may only batch sends/withdrawals when the total number of sends or withdrawal requests in the data store 310 exceeds a threshold or when the total amount exceeds a threshold. This technique may be implemented in order to ensure that the gas/transaction fee savings are worthwhile relative to implementing sends/withdrawals via single transactions. That is, the technique of batching transactions may save resource and gas/transaction fee overhead when a particular number of requests are batched.

The transaction batcher 315 may also consider whether the external address included in the request is considered a new or existing address. A new address is an address that is not associated with any on-chain (on the blockchain) transactions. In some examples, there may be additional gas or transaction fee costs for transactions from a smart contract to a new address. As such, the transaction batcher 315 may not select requests associated with new addresses for batching withdrawals or sends.

After selecting the requests from data store 310, the transaction batcher 315 broadcast a message (e.g., a transaction) to the blockchain, and the message may be configured to call self-executing program 320 to cause transfer of the crypto tokens in accordance with the withdrawal request. The message may include information such as the external addresses to receive the tokens and the amount of tokens to transfer. This information may be retrieved from the data store 310. In response to receiving the message (or being called by the message), the self-executing program 320 may execute a set of state transfers that transfer the crypto tokens from the address associated with the self-executing program 320 to the external addresses included in the message. As such, a single transaction fee may be associated with the transaction broadcast by the custodial token platform such as to call the self-executing program.

FIG. 4 illustrates an example of transfer logic 400 that supports self-executing program for outbound messages in accordance with aspects of the present disclosure. The logic 400 may include a transfer call 405, a send application programming interface (API) 410, and one or more receivers 425. The receivers 425 may be examples of the users 205 as described with respect to FIG. 2 and may be associated with external addresses.

The transfer call 405 may represent the message that calls the self-executing program (batch smart contract) and may include information such as the transfers that are to occur (e.g., token amount and external addresses). The transfer call 405 may be broadcast by the custodial token platform. The transfer call 405 may call the send API 410 of the self-executing program. The send API 410 may cause transfer of the crypto tokens from the address associated with the self-executing program to the external addresses included in the transfer call 405 and associated with the receivers 425. As described, the transfers may be reflected in a single transaction on the blockchain ledger via a set of state transitions.

Figure 5:
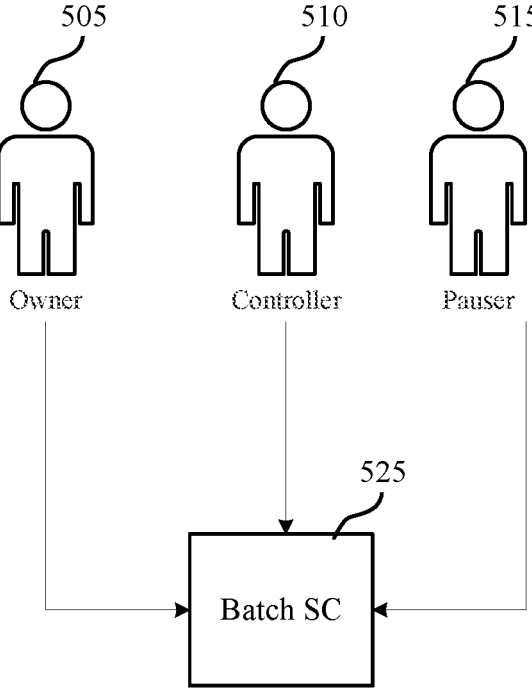
FIG. 5 illustrates an example of management roles that support a self-executing program for outbound messages in accordance with aspects of the present disclosure.

FIG. 5 illustrates an example of management roles 500 that support a self-executing program for outbound messages in accordance with aspects of the present disclosure. The management roles 500 may include an owner 505, a controller 510, and a pauser 515. The roles 500 may be associated with the batch smart contract 525, which may be an example of the self-executing program 320 described with respect to FIG. 3. In particular, each of the roles 500 may be involved in managing and deploying the batch smart contract 525.

The owner 505 may be associated a wallet that "owns" the deployed batch smart contract 525. The wallet address corresponding to the owner 505 may be used to operate (e.g., execute or modify) the batch smart contract 525. For example, the owner 505 may add or remove controller addresses for the batch smart contract 525. In some examples, the owner 505 may control the other roles 500, such as the controller 510 and the pauser 515, as well as add or remove roles associated with managing the batch smart contract 525.

The controller 510 may use the corresponding wallet address to control the actual transfer of the crypto tokens for the batch smart contract 525. For example, the controller 510 may be associated with a particular selected Ethereum (ETH) address to invoke the transfer of Ethereum or ERC-20 to move funds from the contract. The pauser 515 may pause one or more operations of the batch smart contract 525 using the corresponding wallet address. Pausing the one or more operations may temporarily suspend the respective operations of the batch smart contract 525. The pauser 515 may also be used resume a paused operation. In some examples, the pauser 515 may automatically pause operations based on a threshold condition or a trigger event. In other examples, the pauser 515 may manually pause operations, such as based on a request received to pause the operations.

In some instances, the management roles 500 may manage security associated with the batch smart contract 525, and, as described, the management roles 500 may be associated with respective wallet address and corresponding private keys. The private keys may be owned by the custodial token platform. In some examples, the roles may be controlled (e.g., modified or changed) using the owner 505. As such, these management roles 500 may represent a security pattern associated with the batch smart contract 525.

Figure 6:
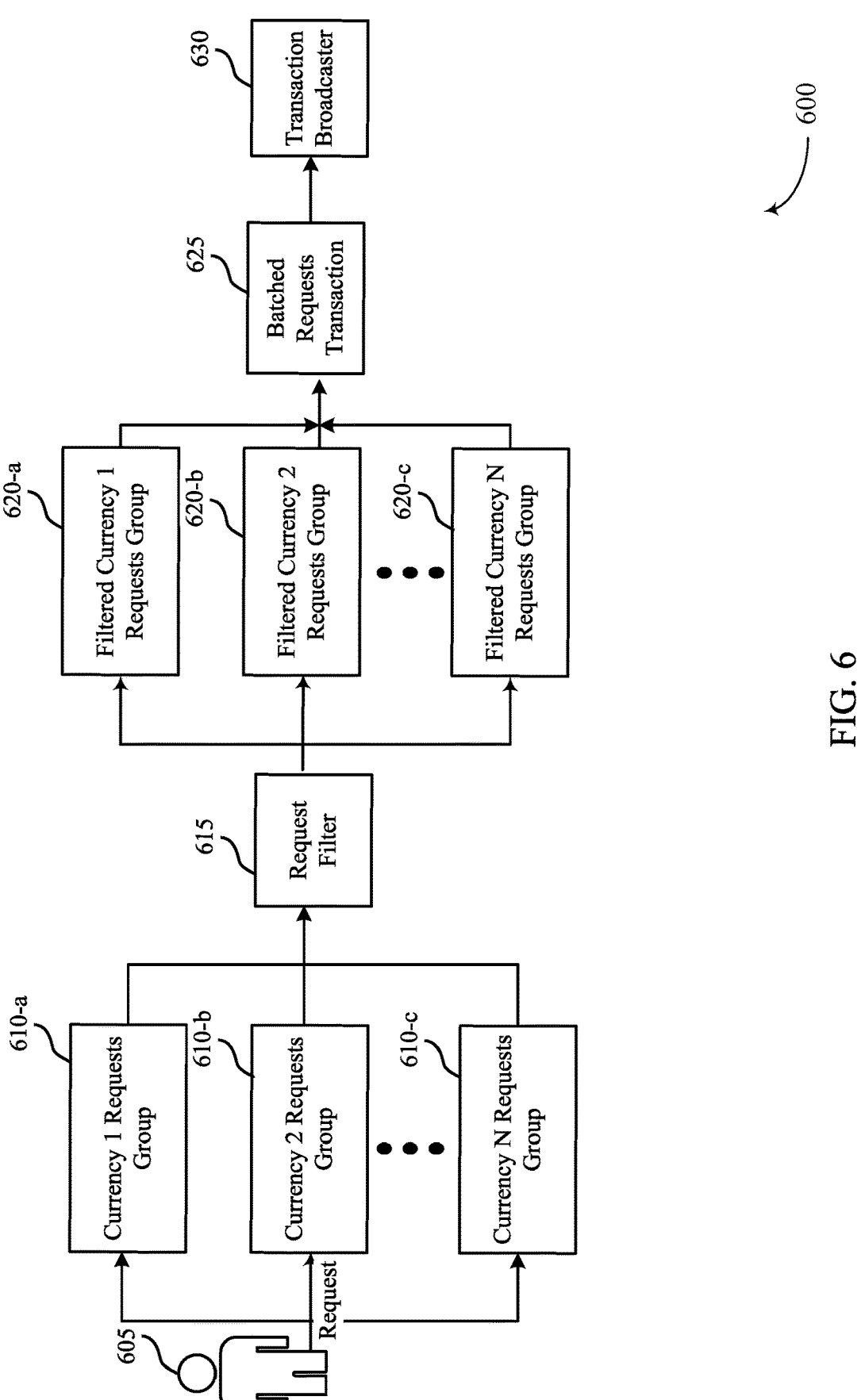
FIG. 6 illustrates an example of a transaction pattern that supports self-executing program for outbound messages in accordance with aspects of the present disclosure.

FIG. 6 illustrates an example of a transaction pattern 600 that supports self-executing program for outbound messages in accordance with aspects of the present disclosure. The transaction pattern 600 may involve one or more multiple senders 605 that request withdrawal or sends of crypto tokens from a custodial token platform to respective external addresses. In some examples, the external addresses may be the same, such that the multiple transfers of the crypto tokens occur between the same sender 605 and receiver.

In the transaction pattern 600, senders 605 may indicate various send or withdrawal requests via a user interface of the custodial token platform. Each withdrawal request may be a crypto token type and amount (e.g., the withdrawal request data store). For batching the requests, the requests may be fetched and grouped based on the crypto currency type (e.g., ETH and ERC-20). In some examples, the purpose of grouping is to compute the total amount on each currency in this fetched list and if it is more than the amount on that currency owned by the smart contract, the smart contract may not serve them all. As illustrated in FIG. 6, the multiple requests received for transfers may be grouped into respective groups based on a currency type. For example, the transfers may be grouped into a first currency requests group 610-a of a first currency type, a second currency requests group 610-b of a second currency type, and up to (as indicated by the ellipses) N currency requests group 610-*c* of N currency type (e.g., where N is a currency type different than the other currency types).

After the requests are grouped based on a currency type, a request filter 615 may be applied to the request groups 610. The request filter 615 may ensure that a total quantity of requests for each currency type is within a request threshold. For example, the threshold may be liquidity for the respective currency type held in the smart contract. In some examples, if the total amount of requests exceeds the respective threshold for the currency type, the batch size for the requests may be increased (e.g., maximized), which may involve sorting the requests by the total quantity and removing requests from the largest total quantity of requests first, and then the second largest total quantity, and so forth, until the threshold or liquidity at the smart contract is not exceeded. In other requests, a FIFO technique may be used, which may involve removing requests based on a chronological order (e.g., removing most recent requests) until the threshold or liquidity is not exceeded by a group 620. As a result, the one or more oldest requests are processed before one or more newer requests.

Processing the request groups 610 through the request filter 615 may result in filtered first currency requests group 620-*a* of the first currency type, a filtered second currency requests group 620-*b* of the second currency type, and up to filtered N currency requests group 620-*c* of N currency type (e.g., where N is a currency type different than the other currency types). The filtered currency requests groups 620 may be proceeded via one or more batched requests transactions 625. For example, a first message (transaction) may broadcast to call the smart contract to execute transfers for requests in filtered first currency requests group 620-*a*, and a second message (transaction) may be broadcast to call the smart contract to execute transfers for requests in filtered requests group 620-*b*, etc. As a result, request selection and filtering may be used to implement the batch transfers as described herein, which may result in reduced transaction fee (gas) and resource overhead.

Figure 7:
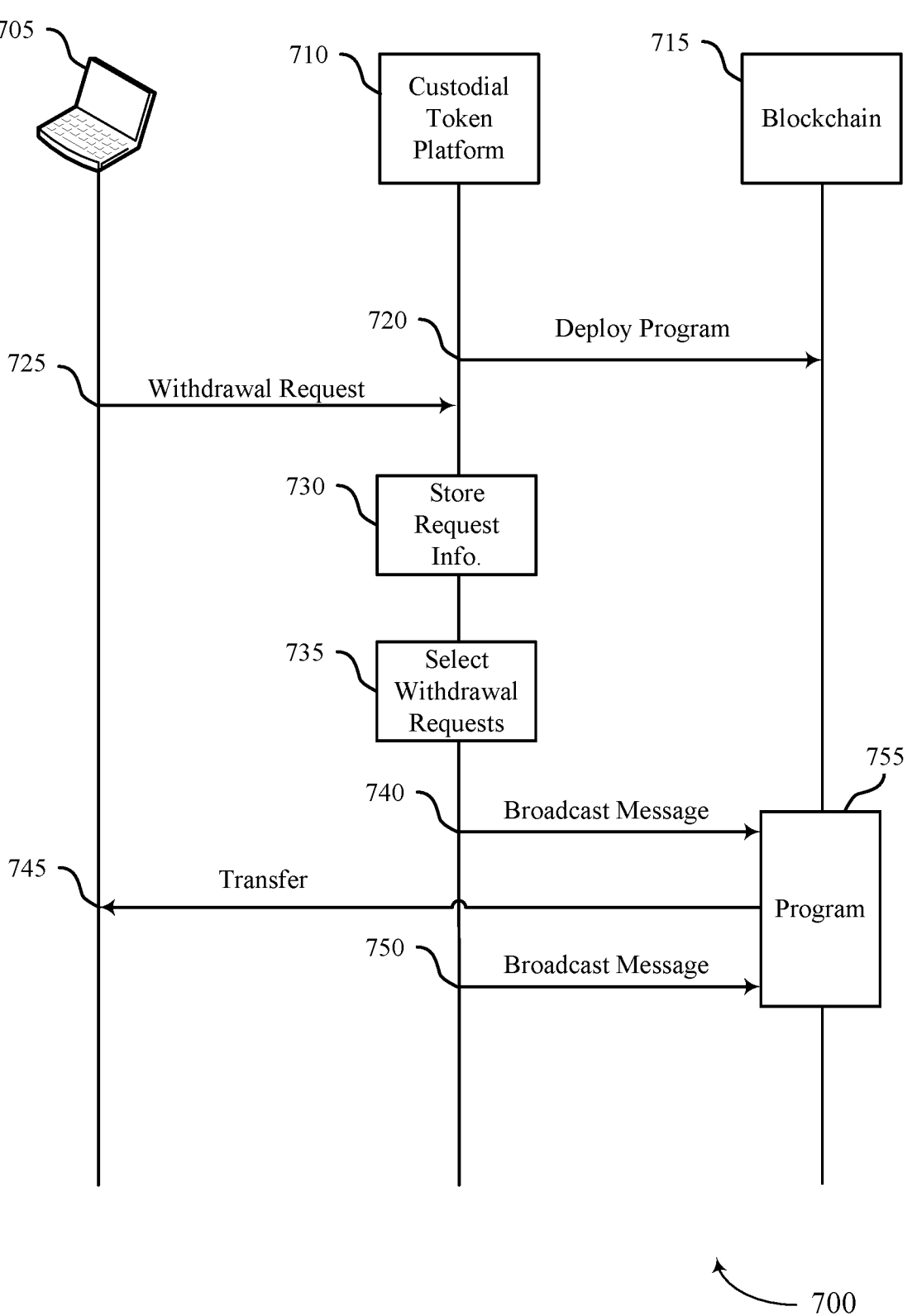
FIG. 7 illustrates an example of a process flow that supports self-executing program for outbound messages in accordance with aspects of the present disclosure.

FIG. 7 illustrates an example of a process flow 700 that supports self-executing program for outbound messages in accordance with aspects of the present disclosure. The process flow 700 includes a user device 705, a custodial token platform 710, and a blockchain 715, which may be examples of the corresponding devices or systems as described herein with respect to FIGS. 1 through 6. In the following description of the process flow 700, the operations between the user device 705, the custodial token platform 710, and the blockchain 715 may be transmitted in a different order than the example order shown, or the operations performed may be performed in different orders or at different times. Some operations may also be omitted from the process flow 700, and other operations may be added to the process flow 700.

At 720, the custodial token platform 710 may deploy to the blockchain distributed data store (e.g., the blockchain 715), a self-executing program 755 configured to batch messages from the self-executing program 755 to multiple addresses of a blockchain distributed data store external to the custodial token platform that is associated with the self-executing program 755.

At 725, the custodial token platform 710 may receive via a user interface (e.g., at the user device 705) associated with the custodial token platform, a withdrawal requests that includes an external address and message information. At 730, the custodial token platform 710 may store, in a withdrawal request data store in response to receiving a withdrawal request at the custodial token platform, the external address and the message information for fulfilling the withdrawal request. the withdrawal request data store may include external addresses and message information (e.g., transaction information) for the plurality of withdrawal requests. The message information may include crypto token type, amount, etc.

At 735, the custodial token platform may select from multiple withdrawal requests and based at least in part on one or more selection criteria, a set of withdrawal requests to fulfill via a batch message from the self-executing program. In some examples, the selecting may be based on a threshold quantity of withdrawal requests for the batch message. In some examples, selecting the set of withdrawal requests includes determining that an external address corresponding to a withdrawal request of the multiple withdrawal requests qualifies as a new address, as well as determining to not fulfill the withdrawal request via the batch message based on determining that the withdrawal request qualifies as the new address. In some examples, selecting the set of withdrawal requests includes determining that an external address corresponding to a withdrawal request of the multiple withdrawal requests qualifies as an existing address and selecting the withdrawal request to fulfill via the batch message. In some examples, selecting the set of withdrawal requests includes selecting the set of withdrawal requests in accordance with a FIFO scheme, selecting withdrawal requests based on a withdrawal amount, or a combination thereof. In additional examples, selecting the set of withdrawal requests includes selecting the set of withdrawal requests based on the set of withdrawal requests being associated with a first crypto token that is native to the blockchain distributed data store (e.g., the native ETH token) or with a one or more second crypto tokens that are supported by respective self-executing programs on the blockchain distributed data store (e.g., ERC-20) tokens). Selecting the set of withdrawal requests may include determining a total amount of the crypto token attributed to an address for the self-executing program 755 on the blockchain distributed data store, as well as filtering or selecting the set of withdrawal requests based at on the total amount of the crypto token and respective amounts associated with each of the withdrawal requests. That is, the custodial token platform 710 may select requests such that a balance threshold or liquidity of the self-executing program 755 is not exceeded.

At 740, the user device 705 may broadcast to the blockchain distributed data store (e.g., the blockchain 715), a message that calls the self-executing program 755. The message may include an indication of a set of external addresses associated with the set of withdrawal requests, and the message may cause a transfer, at 745, of a set of crypto tokens from the self-executing program 755 to the external addresses via the batch message. It should be understood that the transfer may be to one or more external addresses that are not associated with the user device 705.

At 750, the custodial token platform 710 may broadcast, to the blockchain distributed data store, a message that is configured to transfer an amount of the crypto token from an inbound address associated with the custodial token platform to an address associated with the self-executing program 755. The message broadcast at 750 may be an example of a flush transaction that is used to provide liquidity to the self-executing program 755 to fulfill subsequent withdrawal requests. In some examples, the message may be broadcast based on the liquidity at the self-executing program 755 falling below a threshold.

Figure 8:
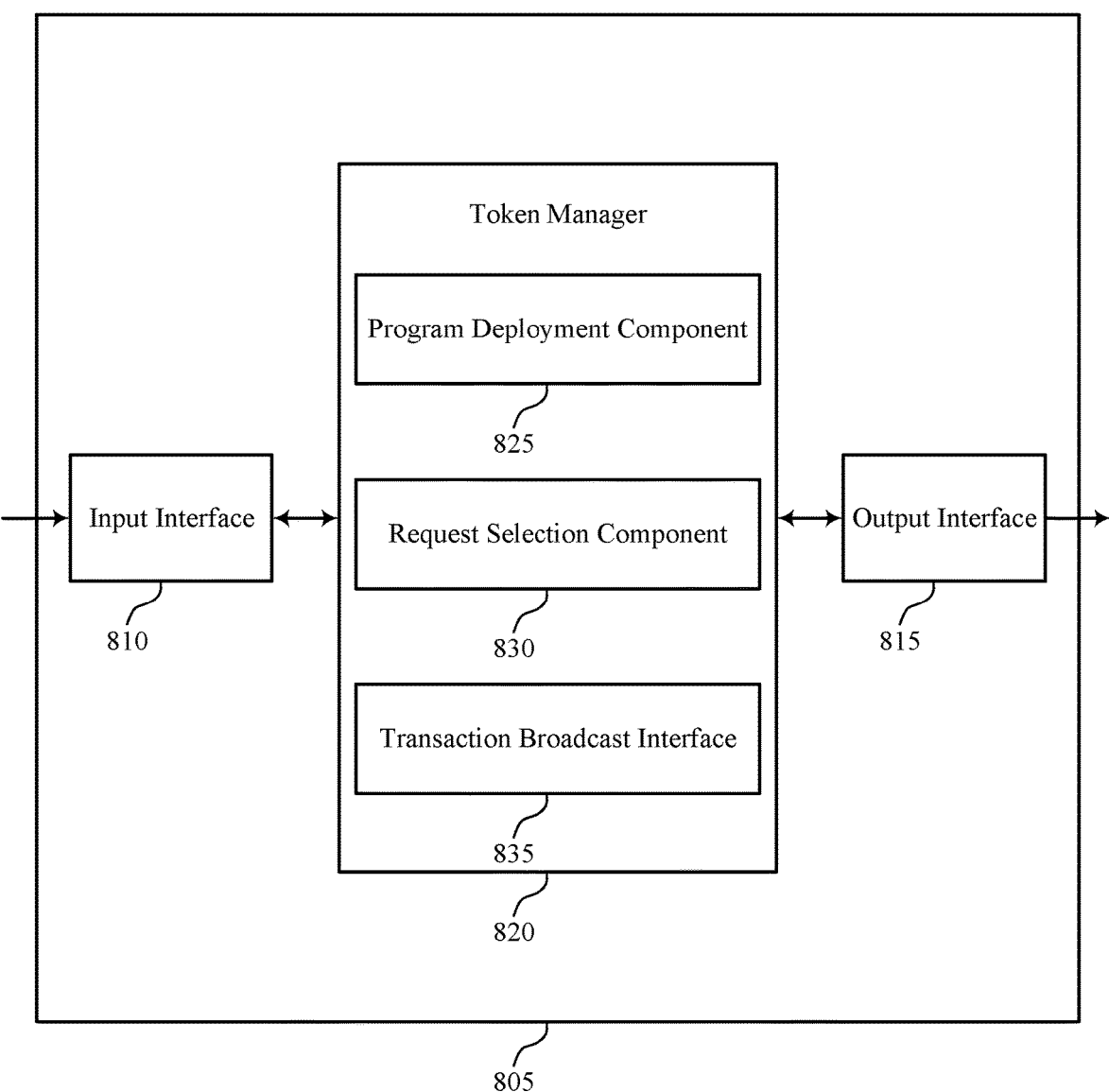
FIG. 8 illustrates a block diagram of an apparatus that supports self-executing program for outbound messages in accordance with aspects of the present disclosure.

FIG. 8 illustrates a block diagram 800 of a system 805 that supports self-executing program for outbound messages in accordance with aspects of the present disclosure. In some examples, the system 805 may be an example of aspects of one or more components described with reference to FIG. 1, such as a custodial token platform 110. The system 805 may include an input interface 810, an output interface 815, and a token manager 820. The system 805 may also include one or more processors. Each of these components may be in communication with one another (e.g., via one or more buses, communications links, communications interfaces, or any combination thereof).

The input interface 810 may manage input signaling for the system 805. For example, the input interface 810 may receive input signaling (e.g., messages, packets, data, instructions, commands, or any other form of encoded information) from other systems or devices. The input interface 810 may send signaling corresponding to (e.g., representative of or otherwise based on) such input signaling to other components of the system 805 for processing. For example, the input interface 810 may transmit such corresponding signaling to the token manager 820 to support self-executing program for outbound messages. In some cases, the input interface 810 may be a component of a network interface 1025 as described with reference to FIG. 10.

The output interface 815 may manage output signaling for the system 805. For example, the output interface 815 may receive signaling from other components of the system 805, such as the token manager 820), and may transmit such output signaling corresponding to (e.g., representative of or otherwise based on) such signaling to other systems or devices. In some cases, the output interface 815 may be a component of a network interface 1025 as described with reference to FIG. 10.

For example, the token manager 820 may include a program deployment component 825, a request selection component 830, a transaction broadcast interface 835, or any combination thereof. In some examples, the token manager 820, or various components thereof, may be configured to perform various operations (e.g., receiving, monitoring, transmitting) using or otherwise in cooperation with the input interface 810, the output interface 815, or both. For example, the token manager 820 may receive information from the input interface 810, send information to the output interface 815, or be integrated in combination with the input interface 810, the output interface 815, or both to receive information, transmit information, or perform various other operations as described herein.

The program deployment component 825 may be configured as or otherwise support a means for deploying, to a blockchain distributed data store, a self-executing program configured to batch messages from the self-executing program to a set of multiple addresses of the blockchain distributed data store that are external to a custodial token platform associated with the self-executing program. The request selection component 830 may be configured as or otherwise support a means for selecting, from a set of multiple withdrawal requests and based on one or more selection criteria, a set of withdrawal requests to fulfill via a batch message from the self-executing program. The transaction broadcast interface 835 may be configured as or otherwise support a means for broadcasting, to the blockchain distributed data store, a message that calls the self-executing program, where the message includes an indication of a set of external addresses associated with the set of withdrawal requests, and where the message causes a transfer of a set of crypto tokens from the self-executing program to the external addresses via the batch message.

Figure 9:
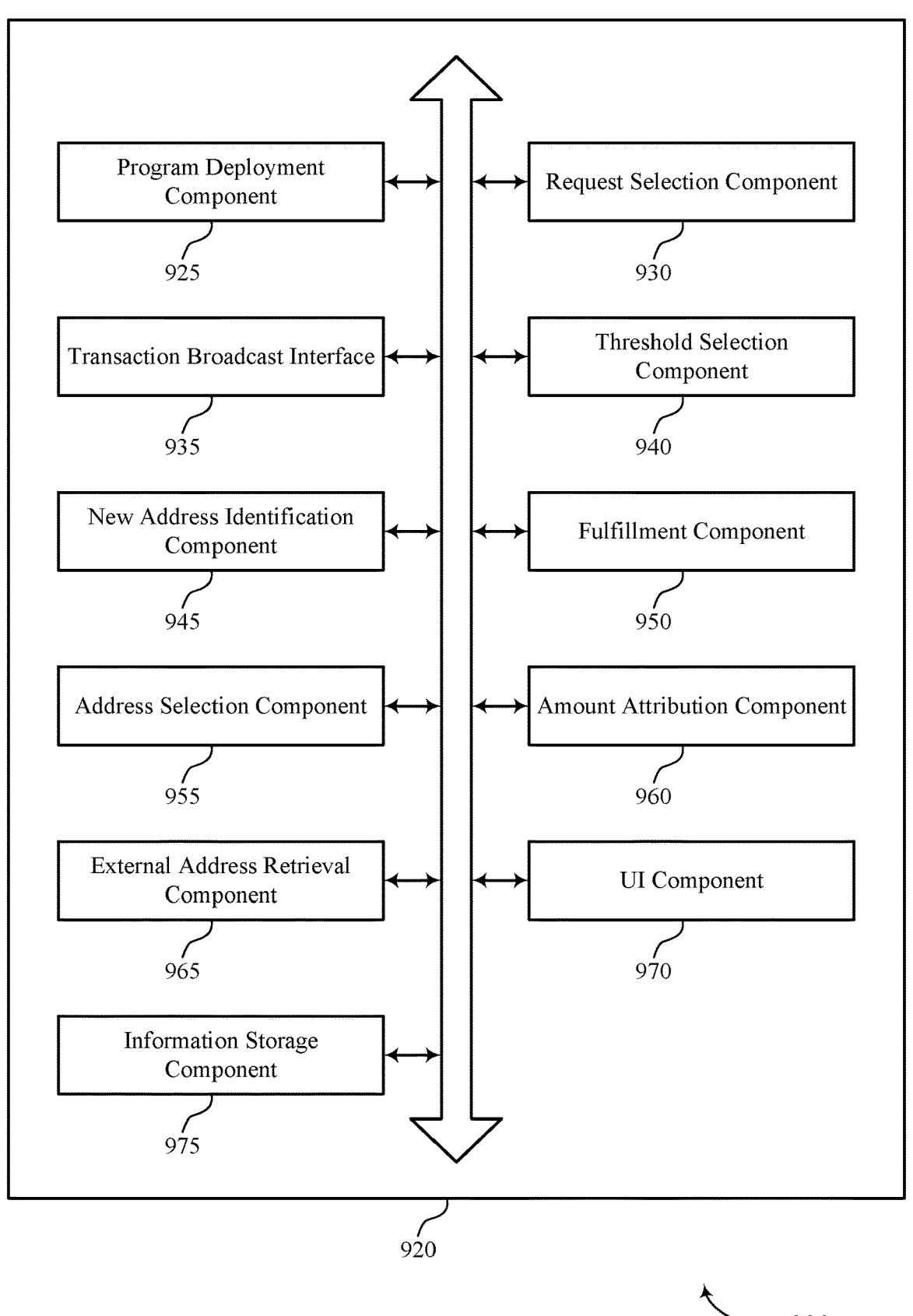
FIG. 9 illustrates a block diagram of a token manager that supports self-executing program for outbound messages in accordance with aspects of the present disclosure.

FIG. 9 illustrates a block diagram 900 of a token manager 920 that supports self-executing program for outbound messages in accordance with aspects of the present disclosure. The token manager 920 may be an example of aspects of a token manager or a token manager 820, or both, as described herein. The token manager 920, or various components thereof, may be an example of means for performing various aspects of self-executing program for outbound messages as described herein. For example, the token manager 920 may include a program deployment component 925, a request selection component 930, a transaction broadcast interface 935, a threshold selection component 940, a new address identification component 945, a fulfillment component 950, an address selection component 955, an amount attribution component 960, an external address retrieval component 965, a UI component 970, an information storage component 975, or any combination thereof. Each of these components may communicate, directly or indirectly, with one another (e.g., via one or more buses, communications links, communications interfaces, or any combination thereof).

The program deployment component 925 may be configured as or otherwise support a means for deploying, to a blockchain distributed data store, a self-executing program configured to batch messages from the self-executing program to a set of multiple addresses of the blockchain distributed data store that are external to a custodial token platform associated with the self-executing program. The request selection component 930 may be configured as or otherwise support a means for selecting, from a set of multiple withdrawal requests and based on one or more selection criteria, a set of withdrawal requests to fulfill via a batch message from the self-executing program. The transaction broadcast interface 935 may be configured as or otherwise support a means for broadcasting, to the blockchain distributed data store, a message that calls the self-executing program, where the message includes an indication of a set of external addresses associated with the set of withdrawal requests, and where the message causes a transfer of a set of crypto tokens from the self-executing program to the external addresses via the batch message.

In some examples, the transfer of the set of crypto tokens occurs via a single message on the blockchain distributed data store.

In some examples, the message causes the transfer of a respective set of one or more crypto tokens to each of the external addresses associated with the set of withdrawal requests.

In some examples, to support selecting the set of withdrawal requests, the threshold selection component 940 may be configured as or otherwise support a means for selecting at least a threshold quantity of withdrawal requests for the batch message.

In some examples, to support selecting the set of withdrawal requests, the new address identification component 945 may be configured as or otherwise support a means for determining that an external address corresponding to a withdrawal request of the set of multiple withdrawal requests qualifies as a new address. In some examples, to support selecting the set of withdrawal requests, the fulfillment component 950 may be configured as or otherwise support a means for determining to not fulfill the withdrawal request via the batch message based on determining that the withdrawal request qualifies as the new address.

In some examples, to support selecting the set of withdrawal requests, the new address identification component

945 may be configured as or otherwise support a means for determining that an external address corresponding to a withdrawal request of the set of multiple withdrawal requests qualifies as an existing address. In some examples, to support selecting the set of withdrawal requests, the address selection component 955 may be configured as or otherwise support a means for selecting the withdrawal request to fulfill via the batch message.

In some examples, to support selecting the set of withdrawal requests, the address selection component 955 may be configured as or otherwise support a means for selecting the set of withdrawal requests in accordance with a first-in-first-out (FIFO) scheme, selecting withdrawal requests based on a withdrawal amount, or a combination thereof.

In some examples, to support selecting the set of withdrawal requests, the address selection component 955 may be configured as or otherwise support a means for selecting the set of withdrawal requests based on the set of withdrawal requests being associated with a first crypto token that is native to the blockchain distributed data store or with a one or more second crypto tokens that are supported by respective self-executing programs on the blockchain distributed data store.

In some examples, to support selecting the set of withdrawal requests, the amount attribution component 960 may be configured as or otherwise support a means for determining a total amount of the crypto token attributed to an address for the self-executing program on the blockchain distributed data store. In some examples, to support selecting the set of withdrawal requests, the address selection component 955 may be configured as or otherwise support a means for filtering or selecting the set of withdrawal requests based on the total amount of the crypto token and respective amounts associated with each of the withdrawal requests.

In some examples, the transaction broadcast interface 935 may be configured as or otherwise support a means for broadcasting, to the blockchain distributed data store, a message that is configured to transfer an amount of the crypto token from an inbound address associated with the custodial token platform to an address associated with the self-executing program.

In some examples, the external address retrieval component 965 may be configured as or otherwise support a means for retrieving, subsequent to selecting the set of withdrawal requests, the external addresses and message information for fulfilling the set of withdrawal requests from a withdrawal request data store, where the message includes the external addresses and the message information in order to cause the transfer.

In some examples, the UI component 970 may be configured as or otherwise support a means for receiving, via a user interface associated with the custodial token platform, an external address and message information. In some examples, the information storage component 975 may be configured as or otherwise support a means for storing, in a withdrawal request data store in response to receiving a withdrawal request at the custodial token platform, the external address and the message information for fulfilling the withdrawal request, where the withdrawal request data store includes external addresses and message information for the set of multiple withdrawal requests.

Figure 10:
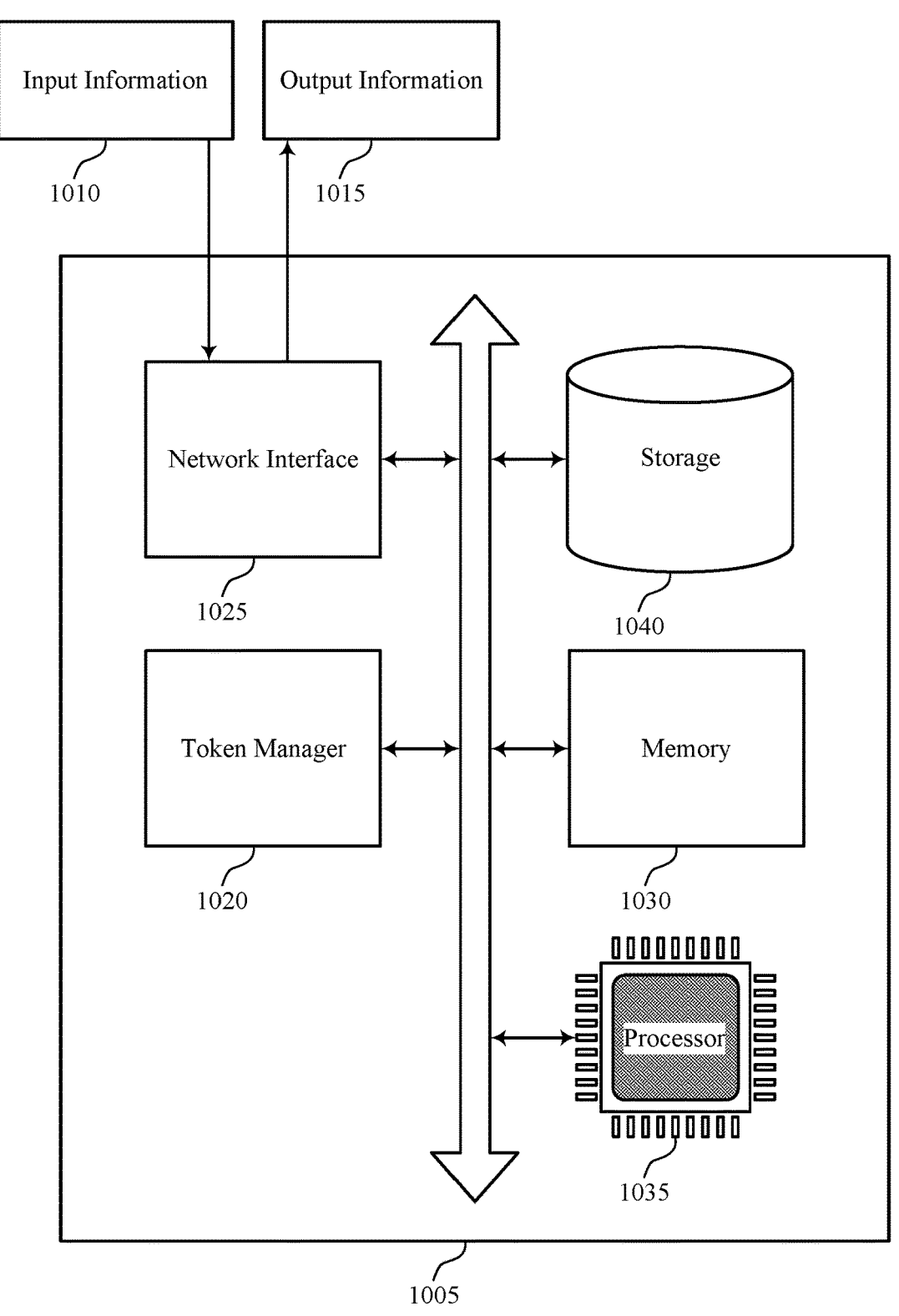
FIG. 10 illustrates a diagram of a system including a device that supports self-executing program for outbound messages in accordance with aspects of the present disclosure.

FIG. 10 illustrates a block diagram 1000 of a system 1005 that supports self-executing program for outbound messages in accordance with aspects of the present disclosure. The system 1005 may be an example of or include the components of a system 805 as described herein. The system 1005 may include components for blockchain distributed data store management, including components such as a token manager 1020, an input information 1010, an output information 1015, a network interface 1025, a memory 1030, a processor 1035, and a storage 1040. These components may be in electronic communication or otherwise coupled with each other (e.g., operatively, communicatively, functionally, electronically, electrically; via one or more buses, communications links, communications interfaces, or any combination thereof). Additionally, the components of the system 1005 may include corresponding physical components or may be implemented as corresponding virtual components (e.g., components of one or more virtual machines). In some examples, the system 1005 may be an example of aspects of one or more components described with reference to FIG. 1, such as a custodial token platform 110.

The network interface 1025 may enable the system 1005 to exchange information (e.g., input information 1010, output information 1015, or both) with other systems or devices (not shown). For example, the network interface 1025 may enable the system 1005 to connect to a network (e.g., a network 105 as described herein). The network interface 1025 may include one or more wireless network interfaces, one or more wired network interfaces, or any combination thereof. In some examples, the network interface 1025 may be an example of may be an example of aspects of one or more components described with reference to FIG. 1, such as one or more network interfaces.

Memory 1030 may include RAM, ROM, or both. The memory 1030 may store computer-readable, computer-executable software including instructions that, when executed, cause the processor 1035 to perform various functions described herein. In some cases, the memory 1030 may contain, among other things, a basic input/output system (BIOS), which may control basic hardware or software operation such as the interaction with peripheral components or devices. In some cases, the memory 1030 may be an example of aspects of one or more components described with reference to FIG. 1, such as one or more memories.

The processor 1035 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 1035 may be configured to execute computer-readable instructions stored in a memory 1030 to perform various functions (e.g., functions or tasks supporting self-executing program for outbound messages). Though a single processor 1035 is depicted in the example of FIG. 10, it is to be understood that the system 1005 may include any quantity of one or more of processors 1035 and that a group of processors 1035 may collectively perform one or more functions ascribed herein to a processor, such as the processor 1035.

Storage 1040 may be configured to store data that is generated, processed, stored, or otherwise used by the system 1005. In some cases, the storage 1040 may include one or more HDDs, one or more SDDs, or both. In some examples, the storage 1040 may be an example of a single database, a distributed database, multiple distributed databases, a data store, a data lake, an emergency backup database, a blockchain distributed data store, or a combination thereof. In some examples, the storage 1040 may be an example of one or more components described with reference to FIG. 1, such as one or more network disks.

For example, the token manager 1020 may be configured as or otherwise support a means for deploying, to a blockchain distributing data store, a self-executing program configured to batch messages from the self-executing program to a set of multiple addresses of the blockchain distributed data store that are external to a custodial token platform associated with the self-executing program. The token manager 1020 may be configured as or otherwise support a means for selecting, from a set of multiple withdrawal requests and based on one or more selection criteria, a set of withdrawal requests to fulfill via a batch message from the self-executing program. The token manager 1020 may be configured as or otherwise support a means for broadcasting, to the blockchain distributing data store, a message that calls the self-executing program, where the message includes an indication of a set of external addresses associated with the set of withdrawal requests, and where the message causes a transfer of a set of crypto tokens from the self-executing program to the external addresses via the batch message.

By including or configuring the token manager 1020 in accordance with examples as described herein, the system 1005 may support techniques for self-executing program for outbound messages, which may provide one or more benefits such as, for example, more efficient utilization of computing resources. In particular, the techniques described herein may facilitate performing a single flush transaction and as such, transferring cryptocurrency from a single smart contract for the flush transaction to the outbound addresses via a single transaction on the blockchain ledger. Thus, these techniques may result in fewer transactions, and as a result, reduced resource overhead and transaction fee overhead for the custodial token platform, among other possibilities.

FIG. 11 illustrates a flowchart showing a method 1100 that supports self-executing program for outbound messages in accordance with aspects of the present disclosure. The operations of the method 1100 may be implemented by a custodial token platform or its components as described herein. For example, the operations of the method 1100 may be performed by a custodial token platform as described with reference to FIGS. 1 through 10. In some examples, a custodial token platform may execute a set of instructions to control the functional elements of the custodial token platform to perform the described functions. Additionally, or alternatively, the custodial token platform may perform aspects of the described functions using special-purpose hardware.

At 1105, the method may include deploying, to a blockchain distributed data store, a self-executing program configured to batch messages from the self-executing program to a set of multiple addresses of the blockchain distributed data store that are external to a custodial token platform associated with the self-executing program. The operations of 1105 may be performed in accordance with examples as disclosed herein. In some examples, aspects of the operations of 1105 may be performed by a program deployment component 925 as described with reference to FIG. 9.

At 1110, the method may include selecting, from a set of multiple withdrawal requests and based on one or more selection criteria, a set of withdrawal requests to fulfill via a batch message from the self-executing program. The operations of 1110 may be performed in accordance with examples as disclosed herein. In some examples, aspects of the operations of 1110 may be performed by a request selection component 930 as described with reference to FIG. 9.

At 1115, the method may include broadcasting, to the blockchain distributed data store, a message that calls the self-executing program, where the message includes an indication of a set of external addresses associated with the set of withdrawal requests, and where the message causes a transfer of a set of crypto tokens from the self-executing program to the external addresses via the batch message. The operations of 1115 may be performed in accordance with examples as disclosed herein. In some examples, aspects of the operations of 1115 may be performed by a transaction broadcast interface 935 as described with reference to FIG. 9.

FIG. 12 illustrates a flowchart showing a method 1200 that supports self-executing program for outbound messages in accordance with aspects of the present disclosure. The operations of the method 1200 may be implemented by a custodial token platform or its components as described herein. For example, the operations of the method 1200 may be performed by a custodial token platform as described with reference to FIGS. 1 through 10. In some examples, a custodial token platform may execute a set of instructions to control the functional elements of the custodial token platform to perform the described functions. Additionally, or alternatively, the custodial token platform may perform aspects of the described functions using special-purpose hardware.

At 1205, the method may include deploying, to a blockchain distributed data store, a self-executing program configured to batch messages from the self-executing program to a set of multiple addresses of the blockchain distributed data store that are external to a custodial token platform associated with the self-executing program. The operations of 1205 may be performed in accordance with examples as disclosed herein. In some examples, aspects of the operations of 1205 may be performed by a program deployment component 925 as described with reference to FIG. 9.

At 1210, the method may include selecting, from a set of multiple withdrawal requests and based on one or more selection criteria, a set of withdrawal requests to fulfill via a batch message from the self-executing program. The operations of 1210 may be performed in accordance with examples as disclosed herein. In some examples, aspects of the operations of 1210 may be performed by a request selection component 930 as described with reference to FIG. 9.

At 1215, the method may include determining that an external address corresponding to a withdrawal request of the set of multiple withdrawal requests qualifies as a new address. The operations of 1215 may be performed in accordance with examples as disclosed herein. In some examples, aspects of the operations of 1215 may be performed by a new address identification component 945 as described with reference to FIG. 9.

At 1220, the method may include determining to not fulfill the withdrawal request via the batch message based on determining that the withdrawal request qualifies as the new address. The operations of 1220 may be performed in accordance with examples as disclosed herein. In some examples, aspects of the operations of 1220 may be performed by a fulfillment component 950 as described with reference to FIG. 9.

At 1225, the method may include determining that an external address corresponding to a withdrawal request of the set of multiple withdrawal requests qualifies as an existing address. The operations of 1225 may be performed in accordance with examples as disclosed herein. In some examples, aspects of the operations of 1225 may be performed by a new address identification component 945 as described with reference to FIG. 9.

At 1230, the method may include selecting the withdrawal request to fulfill via the batch message. The operations of 1230 may be performed in accordance with examples as disclosed herein. In some examples, aspects of the operations of 1230 may be performed by an address selection component 955 as described with reference to FIG. 9.

At 1235, the method may include broadcasting, to the blockchain distributed data store, a message that calls the self-executing program, where the message includes an indication of a set of external addresses associated with the set of withdrawal requests, and where the message causes a transfer of a set of crypto tokens from the self-executing program to the external addresses via the batch message. The operations of 1235 may be performed in accordance with examples as disclosed herein. In some examples, aspects of the operations of 1235 may be performed by a transaction broadcast interface 935 as described with reference to FIG. 9.

FIG. 13 illustrates a flowchart showing a method 1300 that supports self-executing program for outbound messages in accordance with aspects of the present disclosure. The operations of the method 1300 may be implemented by a custodial token platform or its components as described herein. For example, the operations of the method 1300 may be performed by a custodial token platform as described with reference to FIGS. 1 through 10. In some examples, a custodial token platform may execute a set of instructions to control the functional elements of the custodial token platform to perform the described functions. Additionally, or alternatively, the custodial token platform may perform aspects of the described functions using special-purpose hardware.

At 1305, the method may include deploying, to a blockchain distributed data store, a self-executing program configured to batch messages from the self-executing program to a set of multiple addresses of the blockchain distributed data store that are external to a custodial token platform associated with the self-executing program. The operations of 1305 may be performed in accordance with examples as disclosed herein. In some examples, aspects of the operations of 1305 may be performed by a program deployment component 925 as described with reference to FIG. 9.

At 1310, the method may include selecting, from a set of multiple withdrawal requests and based on one or more selection criteria, a set of withdrawal requests to fulfill via a batch message from the self-executing program. The operations of 1310 may be performed in accordance with examples as disclosed herein. In some examples, aspects of the operations of 1310 may be performed by a request selection component 930 as described with reference to FIG. 9.

At 1315, the method may include selecting the set of withdrawal requests based on the set of withdrawal requests being associated with a first crypto token that is native to the blockchain distributed data store or with a one or more second crypto tokens that are supported by respective self-executing programs on the blockchain distributed data store. The operations of 1315 may be performed in accordance with examples as disclosed herein. In some examples, aspects of the operations of 1315 may be performed by an address selection component 955 as described with reference to FIG. 9.

At 1320, the method may include broadcasting, to the blockchain distributed data store, a message that calls the self-executing program, where the message includes an indication of a set of external addresses associated with the set of withdrawal requests, and where the message causes a transfer of a set of crypto tokens from the self-executing program to the external addresses via the batch message. The operations of 1320 may be performed in accordance with examples as disclosed herein. In some examples, aspects of the operations of 1320 may be performed by a transaction broadcast interface 935 as described with reference to FIG. 9.

Figure 14:
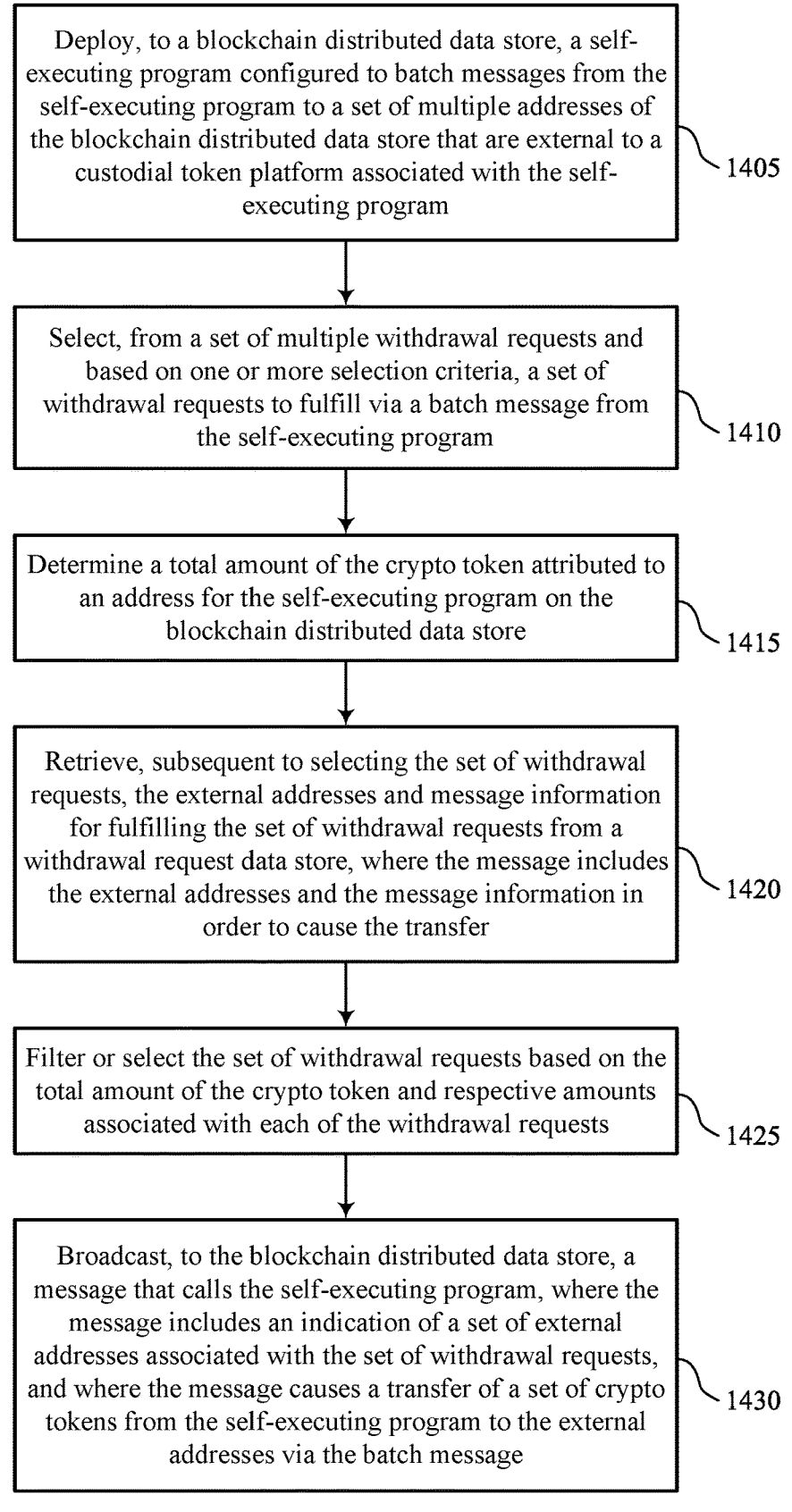

FIG. 14 illustrates a flowchart showing a method 1400 that supports self-executing program for outbound messages in accordance with aspects of the present disclosure. The operations of the method 1400 may be implemented by a custodial token platform or its components as described herein. For example, the operations of the method 1400 may be performed by a custodial token platform as described with reference to FIGS. 1 through 10. In some examples, a custodial token platform may execute a set of instructions to control the functional elements of the custodial token platform to perform the described functions. Additionally, or alternatively, the custodial token platform may perform aspects of the described functions using special-purpose hardware.

At 1405, the method may include deploying, to a blockchain distributed data store, a self-executing program configured to batch messages from the self-executing program to a set of multiple addresses of the blockchain distributed data store that are external to a custodial token platform associated with the self-executing program. The operations of 1405 may be performed in accordance with examples as disclosed herein. In some examples, aspects of the operations of 1405 may be performed by a program deployment component 925 as described with reference to FIG. 9.

At 1410, the method may include selecting, from a set of multiple withdrawal requests and based on one or more selection criteria, a set of withdrawal requests to fulfill via a batch message from the self-executing program. The operations of 1410 may be performed in accordance with examples as disclosed herein. In some examples, aspects of the operations of 1410 may be performed by a request selection component 930 as described with reference to FIG. 9.

At 1415, the method may include determining a total amount of the crypto token attributed to an address for the self-executing program on the blockchain distributed data store. The operations of 1415 may be performed in accordance with examples as disclosed herein. In some examples, aspects of the operations of 1415 may be performed by an amount attribution component 960 as described with reference to FIG. 9.

At 1420, the method may include retrieving, subsequent to selecting the set of withdrawal requests, the external addresses and message information for fulfilling the set of withdrawal requests from a withdrawal request data store, where the message includes the external addresses and the message information in order to cause the transfer. The operations of 1420 may be performed in accordance with examples as disclosed herein. In some examples, aspects of the operations of 1420 may be performed by an external address retrieval component 965 as described with reference to FIG. 9.

At 1425, the method may include filtering or selecting the set of withdrawal requests based on the total amount of the crypto token and respective amounts associated with each of the withdrawal requests. The operations of 1425 may be performed in accordance with examples as disclosed herein. In some examples, aspects of the operations of 1425 may be performed by an address selection component 955 as described with reference to FIG. 9.

At 1430, the method may include broadcasting, to the blockchain distributed data store, a message that calls the self-executing program, where the message includes an indication of a set of external addresses associated with the set of withdrawal requests, and where the message causes a transfer of a set of crypto tokens from the self-executing program to the external addresses via the batch message. The operations of 1430 may be performed in accordance with examples as disclosed herein. In some examples, aspects of the operations of 1430 may be performed by a transaction broadcast interface 935 as described with reference to FIG. 9.

FIG. 15 illustrates a flowchart showing a method 1500 that supports self-executing program for outbound messages in accordance with aspects of the present disclosure. The operations of the method 1500 may be implemented by a custodial token platform or its components as described herein. For example, the operations of the method 1500 may be performed by a custodial token platform as described with reference to FIGS. 1 through 10. In some examples, a custodial token platform may execute a set of instructions to control the functional elements of the custodial token platform to perform the described functions. Additionally, or alternatively, the custodial token platform may perform aspects of the described functions using special-purpose hardware.

At 1505, the method may include deploying, to a blockchain distributed data store, a self-executing program configured to batch messages from the self-executing program to a set of multiple addresses of the blockchain distributed data store that are external to a custodial token platform associated with the self-executing program. The operations of 1505 may be performed in accordance with examples as disclosed herein. In some examples, aspects of the operations of 1505 may be performed by a program deployment component 925 as described with reference to FIG. 9.

At 1510, the method may include receiving, via a user interface associated with the custodial token platform, an external address and message information. The operations of 1510 may be performed in accordance with examples as disclosed herein. In some examples, aspects of the operations of 1510 may be performed by a UI component 970 as described with reference to FIG. 9.

At 1515, the method may include storing, in a withdrawal request data store in response to receiving a withdrawal request at the custodial token platform, the external address and the message information for fulfilling the withdrawal request, where the withdrawal request data store includes external addresses and message information for the set of multiple withdrawal requests. The operations of 1515 may be performed in accordance with examples as disclosed herein. In some examples, aspects of the operations of 1515 may be performed by an information storage component 975 as described with reference to FIG. 9.

At 1520, the method may include selecting, from a set of multiple withdrawal requests and based on one or more selection criteria, a set of withdrawal requests to fulfill via a batch message from the self-executing program. The operations of 1520 may be performed in accordance with examples as disclosed herein. In some examples, aspects of the operations of 1520 may be performed by a request selection component 930 as described with reference to FIG. 9.

At 1525, the method may include broadcasting, to the blockchain distributed data store, a message that calls the self-executing program, where the message includes an indication of a set of external addresses associated with the set of withdrawal requests, and where the message causes a transfer of a set of crypto tokens from the self-executing program to the external addresses via the batch message. The operations of 1525 may be performed in accordance with examples as disclosed herein. In some examples, aspects of the operations of 1525 may be performed by a transaction broadcast interface 935 as described with reference to FIG. 9.

A method is described. The method may include deploying, to a blockchain distributed data store, a self-executing program configured to batch messages from the self-executing program to a set of multiple addresses of the blockchain distributed data store that are external to a custodial token platform associated with the self-executing program, selecting, from a set of multiple withdrawal requests and based on one or more selection criteria, a set of withdrawal requests to fulfill via a batch message from the self-executing program, and broadcasting, to the blockchain distributed data store, a message that calls the self-executing program, where the message includes an indication of a set of external addresses associated with the set of withdrawal requests, and where the message causes a transfer of a set of crypto tokens from the self-executing program to the external addresses via the batch message.

An apparatus is described. The apparatus may include a processor, memory coupled with the processor, and instructions stored in the memory. The instructions may be executable by the processor to cause the apparatus to deploying, to a blockchain distributed data store, a self-executing program configured to batch messages from the self-executing program to a set of multiple addresses of the blockchain distributed data store that are external to a custodial token platform associated with the self-executing program, select, from a set of multiple withdrawal requests and based on one or more selection criteria, a set of withdrawal requests to fulfill via a batch message from the self-executing program, and broadcasting, to the blockchain distributed data store, a message that calls the self-executing program, where the message includes an indication of a set of external addresses associated with the set of withdrawal requests, and where the message causes a transfer of a set of crypto tokens from the self-executing program to the external addresses via the batch message.

Another apparatus is described. The apparatus may include means for deploying, to a blockchain distributed data store, a self-executing program configured to batch messages from the self-executing program to a set of multiple addresses of the blockchain distributed data store that are external to a custodial token platform associated with the self-executing program, means for selecting, from a set of multiple withdrawal requests and based on one or more selection criteria, a set of withdrawal requests to fulfill via a batch message from the self-executing program, and means for broadcasting, to the blockchain distributed data store, a message that calls the self-executing program, where the message includes an indication of a set of external addresses associated with the set of withdrawal requests, and where the message causes a transfer of a set of crypto tokens from the self-executing program to the external addresses via the batch message.

A non-transitory computer-readable medium storing code is described. The code may include instructions executable by a processor to deploying, to a blockchain distributed data store, a self-executing program configured to batch messages from the self-executing program to a set of multiple addresses of the blockchain distributed data store that are external to a custodial token platform associated with the self-executing program, select, from a set of multiple with-drawal requests and based on one or more selection criteria, a set of withdrawal requests to fulfill via a batch message from the self-executing program, and broadcasting, to the blockchain distributed data store, a message that calls the self-executing program, where the message includes an indication of a set of external addresses associated with the set of withdrawal requests, and where the message causes a transfer of a set of crypto tokens from the self-executing program to the external addresses via the batch message.

In some examples of the method, apparatuses, and non-transitory computer-readable medium described herein, the transfer of the set of crypto tokens occurs via a single message on the blockchain distributed data store.

In some examples of the method, apparatuses, and non-transitory computer-readable medium described herein, the message causes the transfer of a respective set of one or more crypto tokens to each of the external addresses asso-ciated with the set of withdrawal requests.

In some examples of the method, apparatuses, and non-transitory computer-readable medium described herein, selecting the set of withdrawal requests may include opera-tions, features, means, or instructions for selecting at least a threshold quantity of withdrawal requests for the batch message.

In some examples of the method, apparatuses, and non-transitory computer-readable medium described herein, selecting the set of withdrawal requests may include opera-tions, features, means, or instructions for determining that an external address corresponding to a withdrawal request of the set of multiple withdrawal requests qualifies as a new address and determining to not fulfill the withdrawal request via the batch message based on determining that the with-drawal request qualifies as the new address.

In some examples of the method, apparatuses, and non-transitory computer-readable medium described herein, selecting the set of withdrawal requests may include opera-tions, features, means, or instructions for determining that an external address corresponding to a withdrawal request of the set of multiple withdrawal requests qualifies as an existing address and selecting the withdrawal request to fulfill via the batch message.

In some examples of the method, apparatuses, and non-transitory computer-readable medium described herein, selecting the set of withdrawal requests may include opera-tions, features, means, or instructions for selecting the set of withdrawal requests in accordance with a first-in-first-out (FIFO) scheme, selecting withdrawal requests based on a withdrawal amount, or a combination thereof.

In some examples of the method, apparatuses, and non-transitory computer-readable medium described herein, selecting the set of withdrawal requests may include opera-tions, features, means, or instructions for selecting the set of withdrawal requests based on the set of withdrawal requests being associated with a first crypto token that may be native to the blockchain distributed data store or with a one or more second crypto tokens that may be supported by respective self-executing programs on the blockchain distributed data store.

In some examples of the method, apparatuses, and non-transitory computer-readable medium described herein, selecting the set of withdrawal requests may include opera-tions, features, means, or instructions for determining a total amount of the crypto token attributed to an address for the self-executing program on the blockchain distributed data store and filtering or selecting the set of withdrawal requests based on the total amount of the crypto token and respective amounts associated with each of the withdrawal requests.

In some examples of the method, apparatuses, and non-transitory computer-readable medium described herein, broadcasting, to the blockchain distributed data store, a message that may be configured to transfer an amount of the crypto token from an inbound address associated with the custodial token platform to an address associated with the self-executing program.

Some examples of the method, apparatuses, and non-transitory computer-readable medium described herein may further include operations, features, means, or instructions for retrieving, subsequent to selecting the set of withdrawal requests, the external addresses and message information for fulfilling the set of withdrawal requests from a withdrawal request data store, where the message includes the external addresses and the message information in order to cause the transfer.

Some examples of the method, apparatuses, and non-transitory computer-readable medium described herein may further include operations, features, means, or instructions for receiving, via a user interface associated with the cus-todial token platform, an external address and message information and storing, in a withdrawal request data store in response to receiving a withdrawal request at the custodial token platform, the external address and the message infor-mation for fulfilling the withdrawal request, where the withdrawal request data store includes external addresses and message information for the set of multiple withdrawal requests.

It should be noted that the methods described above describe possible implementations, and that the operations and the steps may be rearranged or otherwise modified and that other implementations are possible. Further, aspects from two or more of the methods may be combined.

The description set forth herein, in connection with the appended drawings, describes example configurations and does not represent all the examples that may be implemented or that are within the scope of the claims. The term "exem-plary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various com-ponents of the same type may be distinguished by following the reference label by a dash and a second label that distinguishes among the similar components. If just the first reference label is used in the specification, the description is applicable to any one of the similar components having the same first reference label irrespective of the second refer-ence label.

Information and signals described herein may be repre-sented using any of a variety of different technologies and techniques. For example, data, instructions, commands, information, signals, bits, symbols, and chips that may be referenced throughout the above description may be repre-sented by voltages, currents, electromagnetic waves, mag-netic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for data processing comprising:

deploying, to a blockchain distributed data store of a blockchain network comprising a plurality of computing nodes that maintain a blockchain ledger, a self-executing program configured to batch messages from the self-executing program to a plurality of addresses of the blockchain distributed data store that are external to a custodial token platform that manages keys associated with management roles of the self-executing program;

receiving, at the custodial token platform, a plurality of withdrawal requests, each withdrawal request of the plurality of withdrawal requests including respective indications of a crypto token type, an amount of the crypto token type, and an external address to receive the amount of the crypto token type;

selecting, from the plurality of withdrawal requests and based at least in part on one or more selection criteria, a set of withdrawal requests to fulfill via a batch message from the self-executing program;

broadcasting, to the blockchain ledger, a message that calls the self-executing program, wherein the message that calls the self-executing program includes indications of a set of external addresses associated with the set of withdrawal requests and a set of amounts of crypto tokens from the set of withdrawal requests, and wherein the message that calls the self-executing program causes the self-executing program to execute, via a single transaction on the blockchain ledger and after verification of the single transaction by one or more computing nodes of the plurality of computing nodes, a set of transfers of the set of amounts of crypto tokens from a single blockchain address associated with the self-executing program to the set of external addresses in accordance with the indications included in the message that calls the self-executing program via the batch message, wherein the set of amounts of crypto tokens comprise a first amount of a first crypto token associated with a first withdrawal request and a second amount of a second crypto token associated with a second withdrawal request, and wherein the first crypto token is different from the second crypto token; and identifying, after broadcasting the message that calls the self-executing program and that causes the self-executing program to execute the set of transfers, a record of the single transaction on the blockchain ledger based at least in part on the verification of the single transaction by the one or more computing nodes, wherein the single transaction includes multiple state transfers of respective amounts of crypto token types from the single blockchain address to the set of external addresses.

2. The method of claim 1, wherein the message that calls the self-executing program executes the set of transfers of a respective set of one or more crypto tokens to each of the set of external addresses associated with the set of withdrawal requests.

3. The method of claim 1, wherein selecting the set of withdrawal requests comprises:

selecting at least a threshold quantity of withdrawal requests for the batch message.

4. The method of claim 1, wherein selecting the set of withdrawal requests comprises:

determining that an external address corresponding to a withdrawal request of the plurality of withdrawal requests qualifies as a new address; and determining to not fulfill the withdrawal request via the batch message based at least in part on determining that the withdrawal request qualifies as the new address.

5. The method of claim 1, wherein selecting the set of withdrawal requests comprises:

determining that an external address corresponding to a withdrawal request of the plurality of withdrawal requests qualifies as an existing address; and selecting the withdrawal request to fulfill via the batch message.

6. The method of claim 1, wherein selecting the set of withdrawal requests comprises:

selecting the set of withdrawal requests in accordance with a first-in-first-out (FIFO) scheme, selecting withdrawal requests based on a withdrawal amount, or a combination thereof.

7. The method of claim 1, wherein selecting the set of withdrawal requests comprises:

selecting the set of withdrawal requests based at least in part on the set of withdrawal requests being associated with a first crypto token that is native to the blockchain distributed data store or with a one or more second crypto tokens that are supported by respective self-executing programs on the blockchain distributed data store.

8. The method of claim 1, wherein selecting the set of withdrawal requests comprises:

determining a total amount of a crypto token attributed to an address for the self-executing program on the blockchain distributed data store; and filtering or selecting the set of withdrawal requests based at least in part on the total amount of the crypto token and respective amounts associated with each withdrawal request of the plurality of withdrawal requests.

9. The method of claim 1, further comprising:

broadcasting, to the blockchain distributed data store, a message that is configured to transfer an amount of a crypto token from an inbound address associated with the custodial token platform to an address associated with the self-executing program.

10. The method of claim 1, further comprising:

retrieving, subsequent to selecting the set of withdrawal requests, the set of external addresses and message information for fulfilling the set of withdrawal requests from a withdrawal request data store, wherein the message that calls the self-executing program includes the set of external addresses and the message information in order to cause the set of transfers.

11. The method of claim 1, further comprising:

receiving, via a user interface associated with the custodial token platform, an external address and message information; and storing, in a withdrawal request data store in response to receiving a withdrawal request at the custodial token platform, the external address and the message information for fulfilling the withdrawal request, wherein the withdrawal request data store comprises external addresses and message information for the plurality of withdrawal requests.

12. The method of claim 1, further comprising:

verifying, by the one or more computing nodes of the plurality of computing nodes, the message that calls the self-executing program; and executing, by the self-executing program in response to verification of the message that calls the self-executing program, the set of transfers that transfers the set of amounts of the crypto token types to corresponding external address of the set of external addresses associated with the set of withdrawal requests, wherein execution of the set of transfers by the self-executing program results in the record of the single transaction including the multiple transfers on the blockchain ledger.

13. An apparatus, comprising:

a processor;

memory coupled with the processor; and instructions stored in the memory and executable by the processor to cause the apparatus to:

deploy, to a blockchain distributed data store of a blockchain network comprising a plurality of computing nodes that maintain a blockchain ledger, a self-executing program configured to batch messages from the self-executing program to a plurality of addresses of the blockchain distributed data store that are external to a custodial token platform that manages keys associated with management roles of the self-executing program;

receive, at the custodial token platform, a plurality of withdrawal requests, each withdrawal request of the plurality of withdrawal requests including respective indications of a crypto token type, an amount of the crypto token type, and an external address to receive the amount of the crypto token type;

select, from the plurality of withdrawal requests and based at least in part on one or more selection criteria, a set of withdrawal requests to fulfill via a batch message from the self-executing program;

broadcast, to the blockchain ledger, a message that calls the self-executing program, wherein the message that calls the self-executing program includes indications of a set of external addresses associated with the set of withdrawal requests and a set of amounts of crypto tokens from the set of withdrawal requests, and wherein the message that calls the self-executing program causes the self-executing program to execute, via a single transaction on the blockchain ledger and after verification of the single transaction by one or more computing nodes of the plurality of computing nodes, a set of transfers of the set of amounts of crypto tokens from a single blockchain address associated with the self-executing program to the set of external addresses in accordance with the indications included in the message that calls the self-executing program via the batch message, wherein the set of amounts of crypto tokens comprise a first amount of a first crypto token associated with a first withdrawal request and a second amount of a second crypto token associated with a second withdrawal request, and wherein the first crypto token is different from the second crypto token; and identify, after broadcasting the message that calls the self-executing program and that causes the self-executing program to execute the set of transfers, a record of the single transaction on the blockchain ledger based at least in part on the verification of the single transaction by the one or more computing nodes, wherein the single transaction includes multiple state transfers of respective amounts of crypto token types from the single blockchain address to the set of external addresses.

14. The apparatus of claim 13, wherein the message that calls the self-executing program executes the set of transfers of a respective set of one or more crypto tokens to each of the set of external addresses associated with the set of withdrawal requests.

15. The apparatus of claim 13, wherein the instructions to select the set of withdrawal requests are executable by the processor to cause the apparatus to:

select at least a threshold quantity of withdrawal requests for the batch message.

16. A non-transitory computer-readable medium storing code, the code comprising instructions executable by a processor to:

deploy, to a blockchain distributed data store of a blockchain network comprising a plurality of computing nodes that maintain a blockchain ledger, a self-executing program configured to batch messages from the self-executing program to a plurality of addresses of the blockchain distributed data store that are external to a custodial token platform that manages keys associated with management roles of the self-executing program;

receive, at the custodial token platform, a plurality of withdrawal requests, each withdrawal request of the plurality of withdrawal requests including respective indications of a crypto token type, an amount of the crypto token type, and an external address to receive the amount of the crypto token type;

select, from the plurality of withdrawal requests and based at least in part on one or more selection criteria, a set of withdrawal requests to fulfill via a batch message from the self-executing program;

broadcast, to the blockchain ledger, a message that calls the self-executing program, wherein the message that calls the self-executing program includes indications of a set of external addresses associated with the set of withdrawal requests and a set of amounts of crypto tokens from the set of withdrawal requests, and wherein the message that calls the self-executing program causes the self-executing program to execute, via a single transaction on the blockchain ledger and after verification of the single transaction by one or more computing nodes of the plurality of computing nodes, a set of transfers of the set of amounts of crypto tokens from a single blockchain address associated with the self-executing program to the set of external addresses in accordance with the indications included in the message that calls the self-executing program via the batch message, wherein the set of amounts of crypto tokens comprise a first amount of a first crypto token associated with a first withdrawal request and a second amount of a second crypto token associated with a second withdrawal request, and wherein the first crypto token is different from the second crypto token; and identify, after broadcasting the message that calls the self-executing program and that causes the self-executing program to execute the set of transfers, a record of the single transaction on the blockchain ledger based at least in part on the verification of the single transaction by the one or more computing nodes, wherein the single transaction includes multiple state transfers of respective amounts of crypto token types from the single blockchain address to the set of external addresses.

17. The non-transitory computer-readable medium of claim 16, wherein the message that calls the self-executing program executes the set of transfers of a respective set of one or more crypto tokens to each of the set of external addresses associated with the set of withdrawal requests.

18. The non-transitory computer-readable medium of claim 16, wherein the instructions to select the set of withdrawal requests are executable by the processor to:

select at least a threshold quantity of withdrawal requests for the batch message.

\* \* \* \* \*